US010273932B2

(12) United States Patent
Kassianoff

(10) Patent No.: US 10,273,932 B2
(45) Date of Patent: Apr. 30, 2019

(54) OSCILLATING PROPULSOR

(71) Applicant: Edouard Kassianoff, Calgary (CA)

(72) Inventor: Edouard Kassianoff, Calgary (CA)

( * ) Notice: Subject to any disclaimer, the term of this patent is extended or adjusted under 35 U.S.C. 154(b) by 0 days.

(21) Appl. No.: 14/889,614

(22) PCT Filed: Jun. 25, 2014

(86) PCT No.: PCT/CA2014/050605
§ 371 (c)(1),
(2) Date: Nov. 12, 2015

(87) PCT Pub. No.: WO2015/003261
PCT Pub. Date: Jan. 15, 2015

(65) Prior Publication Data
US 2016/0083060 A1     Mar. 24, 2016

(30) Foreign Application Priority Data

Jul. 11, 2013   (CA) .................................... 2821427
Nov. 7, 2013    (CA) .................................... 2832623
Jun. 12, 2014   (CA) .................................... 2854305

(51) Int. Cl.
*B63H 1/30*       (2006.01)
*B60F 3/00*       (2006.01)
(Continued)

(52) U.S. Cl.
CPC ............ *F03B 17/06* (2013.01); *B60F 3/0007* (2013.01); *B63H 1/30* (2013.01); *B63H 1/32* (2013.01);
(Continued)

(58) Field of Classification Search
CPC ... B63H 1/32; B63H 1/30; F03B 13/20; F03B 17/06; F03D 5/06; Y02E 10/38;
(Continued)

(56) References Cited
U.S. PATENT DOCUMENTS 2,751,876 A  *  6/1956  Ogilvie .................... B63H 1/32
                                                        440/25
3,757,729 A  *  9/1973  Golden .................. B63H 16/04
                                                        440/19
(Continued)

FOREIGN PATENT DOCUMENTS

GB          962917      *  7/1964

*Primary Examiner* — Michael C Zarroli

(57) ABSTRACT

A curved body (830), for propelling fluids, crafts and harvesting fluid power, comprises a convex outer leading surface securely connected to a concave inner trailing surface to define an open vessel. Upon oscillation, ambient fluids are accelerated and ejected from the vessel to propel the vessel and the ambient fluids in opposite directions. Apparatus is secured to a motive power source directly or via actuating member (832), by fastening through aperture (834). The oscillating propulsor can be operated directly by a reciprocating motive power source, and indirectly by the reaction momentum imparted to a supporting base. Thrust may be vectored by rotation of the curved body (830) about the supporting base. Drag reduction using fluid dynamic shapes, intake openings, a fore fin (844), an aft fin (846), and a lubricant cavity, are embodied. Enhanced propulsion using multistage oscillating propulsors is embodied.

60 Claims, 12 Drawing Sheets

(51) Int. Cl.
*F03B 17/06* (2006.01)
*B63H 1/32* (2006.01)
*F03B 13/20* (2006.01)
*F03D 5/06* (2006.01)
*B63H 3/00* (2006.01)
*B64C 11/32* (2006.01)
*B64C 25/32* (2006.01)
*B64C 29/00* (2006.01)
*F03B 13/14* (2006.01)

(52) U.S. Cl.
CPC ............ B63H 3/008 (2013.01); B64C 11/325 (2013.01); B64C 25/32 (2013.01); B64C 29/0008 (2013.01); F03B 13/14 (2013.01); F03B 13/20 (2013.01); F03D 5/06 (2013.01); *F05B 2210/16* (2013.01); *F05B 2220/90* (2013.01); *F05B 2240/311* (2013.01); *F05B 2240/931* (2013.01); *Y02E 10/28* (2013.01); *Y02E 10/38* (2013.01); *Y02E 10/70* (2013.01); *Y02E 10/721* (2013.01); *Y02T 70/5254* (2013.01)

(58) Field of Classification Search
CPC ... Y02E 10/28; Y02E 10/70; F05B 2240/931; Y02T 70/5254; F02K 9/82
See application file for complete search history.

(56) References Cited

U.S. PATENT DOCUMENTS

| 4,427,341 | A | * | 1/1984 | Eichler | B63H 1/14 416/142 |
| 5,327,721 | A | * | 7/1994 | Bulman | F02K 7/12 60/269 |
| 7,088,012 | B2 | * | 8/2006 | Gizara | F03B 17/065 290/43 |
| 7,874,882 | B2 | * | 1/2011 | Sagov | B63H 1/36 440/14 |
| 8,206,113 | B2 | * | 6/2012 | Ryynanen | F03B 13/183 415/3.1 |
| 2011/0215204 | A1 | * | 9/2011 | Evulet | B64D 33/02 244/53 B |
| 2014/0001761 | A1 | * | 1/2014 | Weiland | F03B 13/10 290/54 |

* cited by examiner

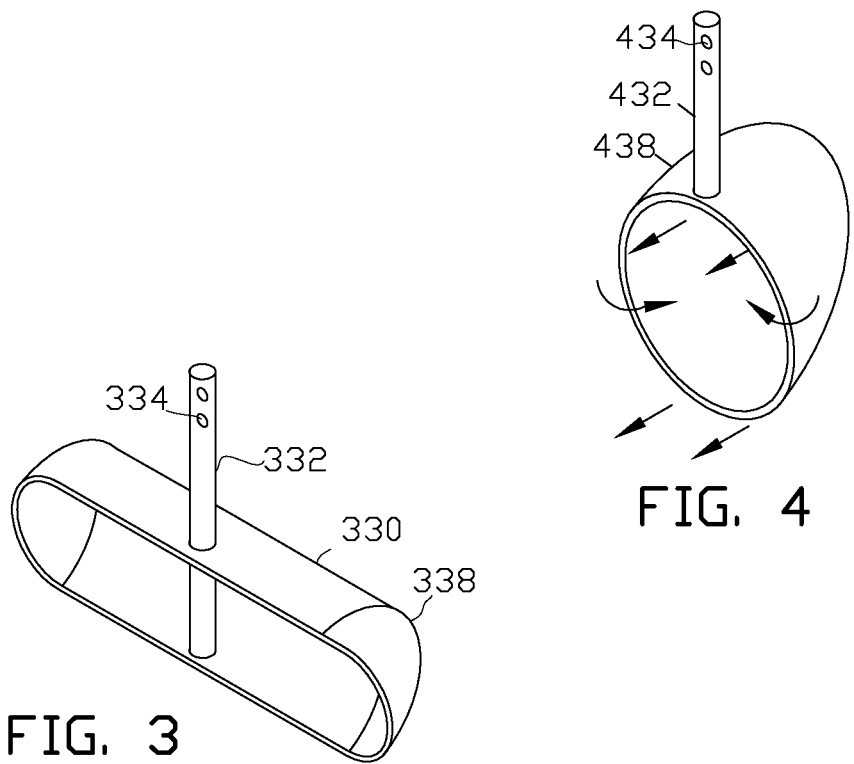
FIG. 3
FIG. 4
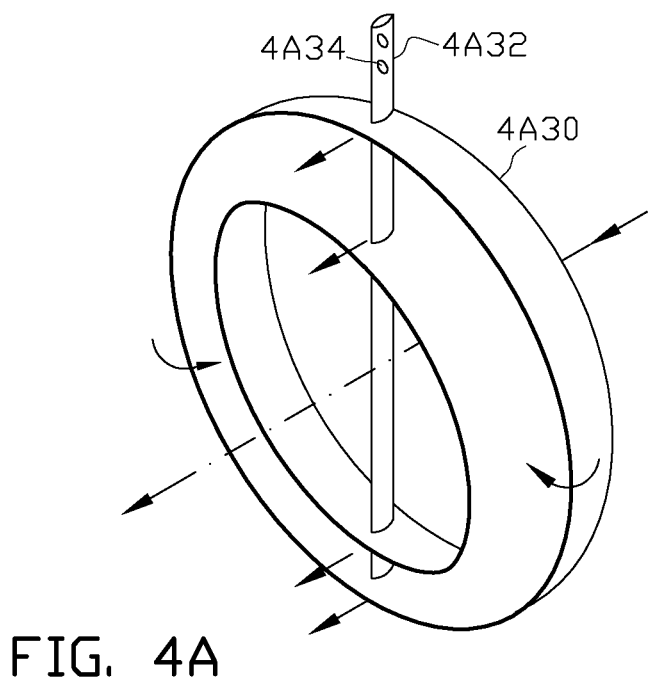
FIG. 4A

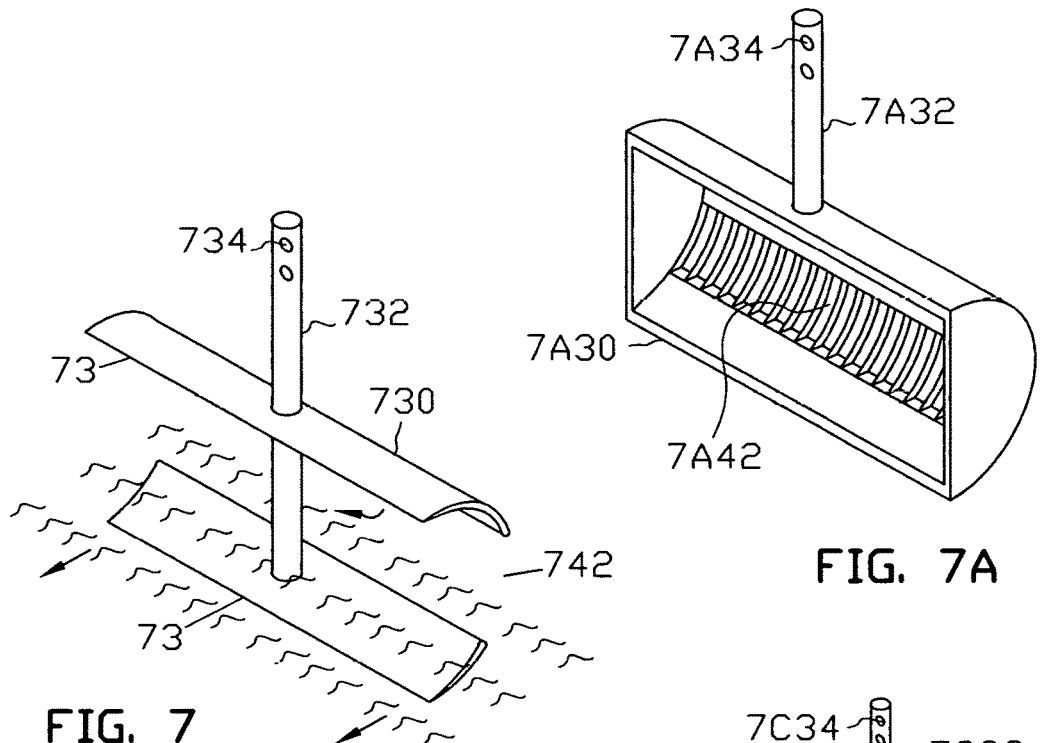
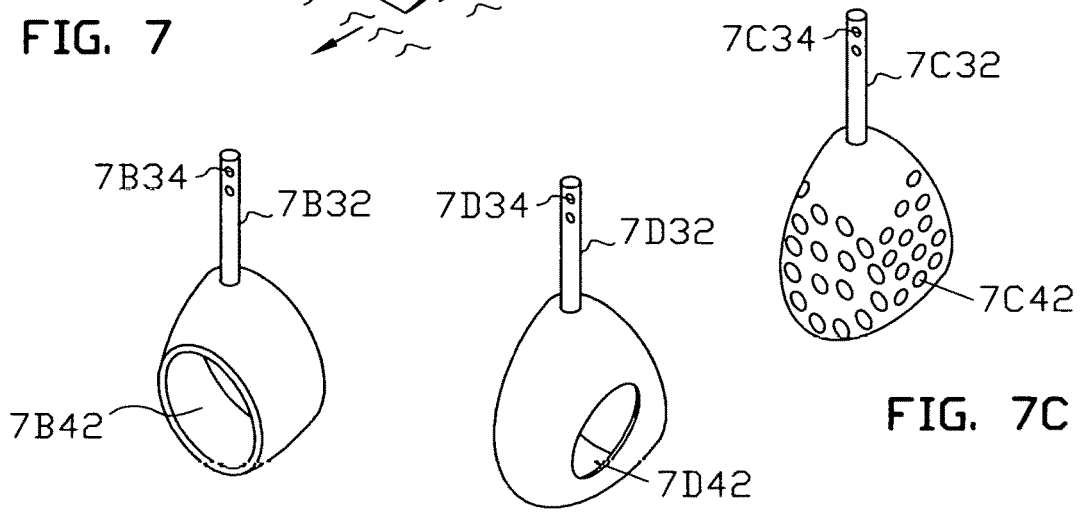
FIG. 7
FIG. 7A
FIG. 7B
FIG. 7C
FIG. 7D

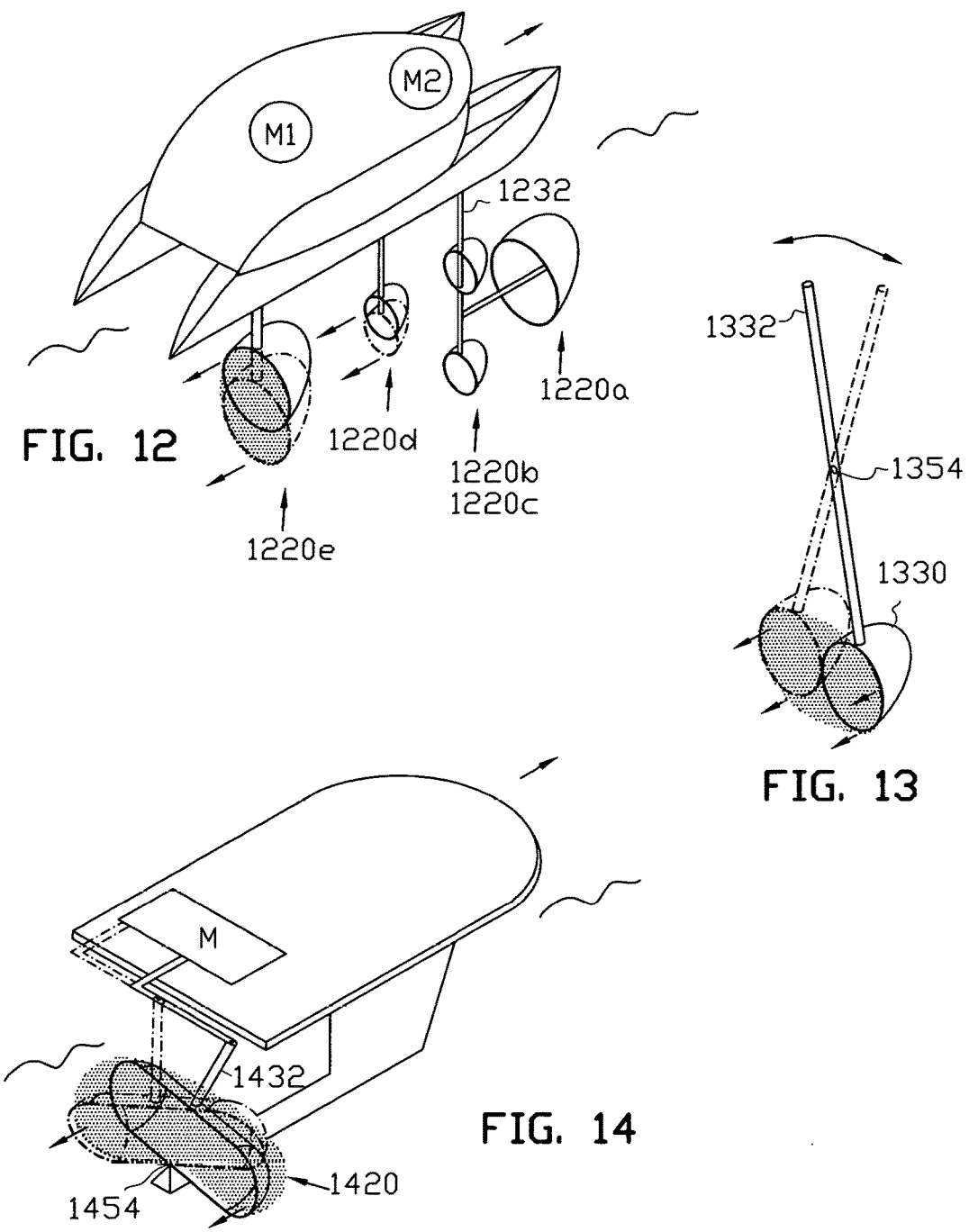

US 10,273,932 B2

OSCILLATING PROPULSOR

TECHNICAL FIELD

The present invention relates to propulsion systems and, more particularly, to devices that propel fluids and crafts in oscillation mode.

BACKGROUND ART

The propeller screw and its many modifications form the basis of most current propulsion systems. Design and manufacture of the propeller screw requires mastery of foil dynamics in which profile, shape, area, angle, number of blades, and speed are important parameters. Moreover, the phenomena of cavitation and stall limit the performance of the majority of propeller screws. Propeller screws are also sometimes lethal to wildlife.

There is an effort to develop alternative propulsion systems in the form of reciprocating wings, with a promise of greater efficiency. Most engines in use today are of the reciprocating type, yet they are invariably used in rotary mode; the mechanical simplification afforded by direct drive of oscillating propulsion systems would be a major advantage. Reciprocating propulsion systems may also be better suited to harnessing wave power for propulsion, further increasing efficiency and helping to preserve the environment through reduced hydrocarbon use. However, current reciprocating propulsion systems are still based mostly on the airfoil or hydrofoil concept and can be expected to suffer from some of the limitations of the propeller screw, as already outlined.

A different approach to fluid propulsion involves imparting energy to a contained volume of fluid before discharge; other than enclosed propellers it appears that piston and diaphragm pumps, and the likes are the existing alternatives, with limited market success in craft propulsion. A submersible buoyant cup with transverse opening is disclosed in U.S. Pat. No. 3,236,203 to Bramson (1966): this design is based on raising a volume of water in the cup from a body of water to a height above the body of water for release under the influence of gravity. Drainage of water from the cup imparts a reaction force to the cup. Thrust from Bramson (1966) device is limited by the gravity of the Earth, a relatively constant force. The potential power of this design is also limited by the diameter of the cup, since discharge of water at a height greater than the diameter of the cup may not add substantially to propulsion; the cup would start discharging its content as soon as it emerges from the water body and would be completing its discharge by the time the whole cup is out of the water body, depending off course on the dimensions of the cup. On the other hand, the time required to fill the cup under water would also be similarly limited by the cup dimensions and the potential for air entrapment within the cup. The above limitations imply a maximum stroke rate and speed for the device, governed by cup dimensions, geometry, gravity, and fluiddynamics considerations. Bramson (1966) propulsion device must surface to produce thrust. To this end the geometry and buoyancy of the cup are for water retention and conveyance to the surface and not for submerged operation. The need to surface also reduces efficiency since thrust would be produced mostly at the end of the upward stroke, as water egresses from the cup.

The novel oscillating propulsor of the present disclosure can operate partially or fully submerged. The unique geometry and operation of the oscillating propulsor provide for cyclic acceleration and ejection of a volume of fluid to produce thrust and enable displacement. Other objects and advantages of my invention will become apparent from the detailed description that follows and upon reference to the drawings.

BRIEF DESCRIPTION OF THE DRAWINGS

A complete understanding of the present invention may be obtained by reference to the accompanying drawings, when considered in conjunction with the subsequent, detailed description, in which:

FIG. 3 is a perspective view of a curved body with spherical end caps;

FIG. 4 is a perspective view of the embodiment of FIG. 3 at minimum length limit;

FIG. 4A is a perspective view of the embodiment of FIG. 1 bent into a toroidal curved body;

FIG. 7 is a perspective view of an oscillating propulsor with a fluid intake opening across die convex outer leading and the concave inner trailing surfaces of the curved body;

FIG. 7A is a perspective view of an oscillating propulsor with a slotted intake opening across the convex outer leading and the concave inner trailing surfaces of the curved body;

FIG. 7B is a perspective view of the oscillating propulsor of FIG. 4 with an intake opening across the convex outer leading and the concave inner trailing surfaces of the curved body;

FIG. 7C is a perspective view of the oscillating propulsor of FIG. 4 with a plurality of intake openings across the convex outer leading and the concave inner trailing surfaces of the curved body;

FIG. 7D is a perspective view of another embodiment of the oscillating propulsor of FIG. 4 fitted with an intake opening;

FIG. 12 is a perspective view of a stylized catamaran watercraft propelled by multistage oscillating propulsors, with the plane of oscillation being coplanar with the plane of the vessel's opening (section plane of segment of sphere), illustrated by stippling;

FIG. 13 is a perspective view of an oscillating propulsor with a levered actuating member: plane of oscillaton is the plane of the vessel's opening (section plane of segment of sphere), illustrated by stippling;

FIG. 14 is a perspective view of a stylized watercraft propelled by swivelling actuation of the oscillating propulsor of FIG. 3: plane of vessel's opening and oscillation is illustrated by stippling;

OSCILLATING PROPULSOR—DISCLOSURE OF INVENTION

Figure 5:
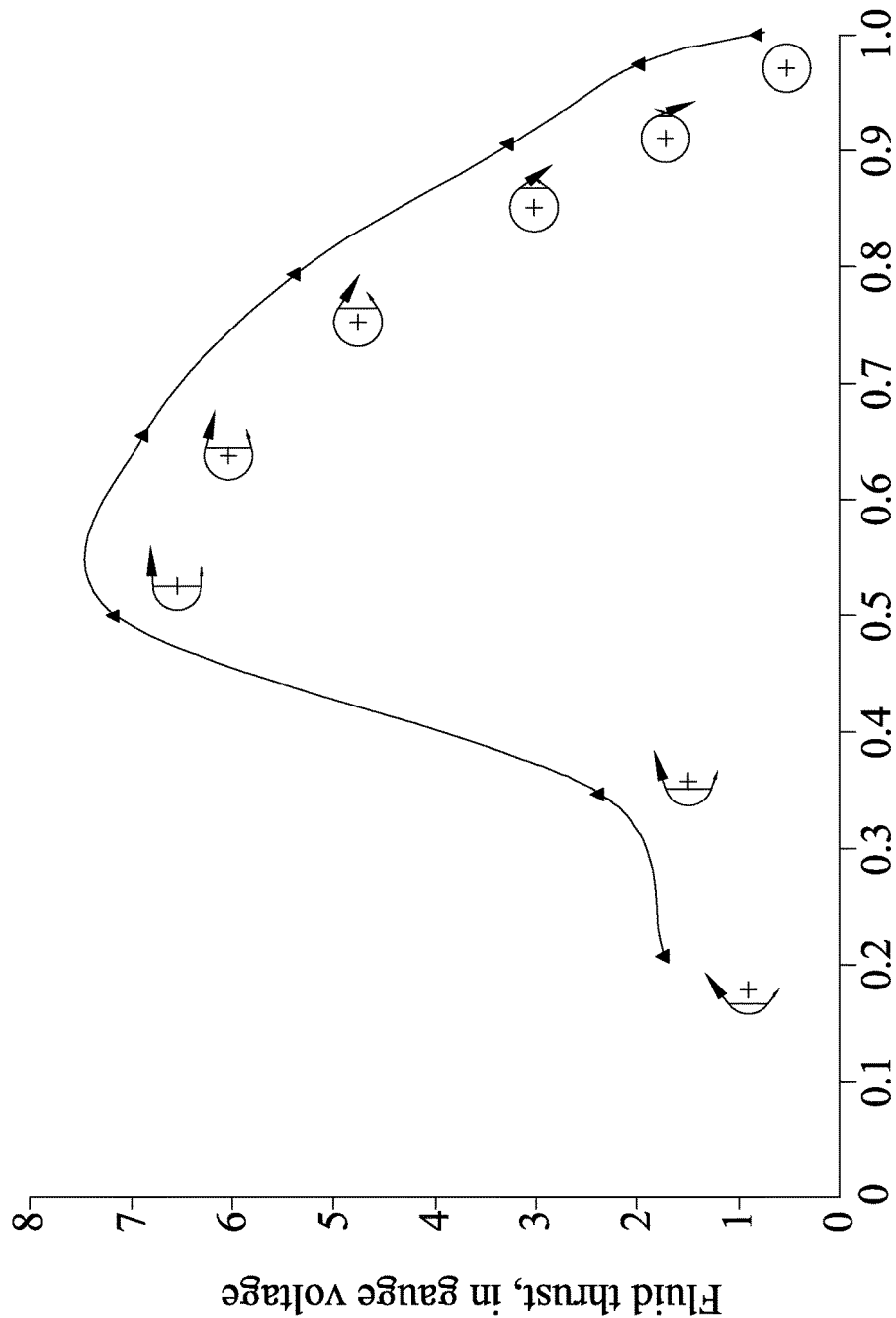
FIG. 5 is a chart view of the influence of size and geometry on thrust in water for a spherical curved body of 38 mm radius, oscillated at 30 strokes/sec and a stroke length of 19 mm.

An open vessel made out of a curved body, a segment of a sphere or of a cylinder for example, can propel ambient fluids from its opening, upon reciprocation or oscillation. Such a vessel can be described as comprising a convex outer, leading surface with a first perimeter edge, and a concave inner, trailing surface with a second perimeter edge. The convex outer surface is securely connected to the concave inner surface in a substantially concentric manner to define a vessel with an opening. Upon oscillation, ambient fluids are ejected from the vessel through the opening, inducing an inflow of replacement fluids into the vessel. Ejection of fluids from the vessel generates a thrust force that urges the vessel in a direction opposite that of fluid ejection. The vessel and any attachments to it, for example a base or a craft, can thus be propelled in a direction opposite that of the ambient fluids ejected from the apparatus. The magnitude of the thrust force generated by the oscillating propulsor of this disclosure is positively related to the size of the vessel, the oscillation frequency and the length of the stroke. The geometry of the vessel has a remarkable influence on the magnitude of the thrust force generated upon oscillation; for example, when a 38 mm diameter curved body of spherical profile is oscillated through a 19 mm stroke length at 30 strokes/second, maximum thrust is achieved when the vessel profile approximates that of a hemisphere, as illustrated in FIG. 5: transverse profiles of the segments of sphere are depicted for the data coordinates shown, the vessel's opening being inherently coplanar with the section plane; fluid ejection angles for oscillation of the segments of sphere along the Y-axis or in the section plane, are illustrated, for example, by arrows, the bottom arrows being minimized for clarity of presentation. Materials and methods for fabrication of metals, polymers and composites products are known to those skilled in the art and can be applied to the manufacture of the apparatus. A vessel with a curved surface, a part sphere or part cylinder for example, can be made out of wood, bamboo, fruit (e.g. coconut), metal, polymer, composite materials or a combination therefrom. Any other material suitable and appropriate for the application circumstances of use can also be utilized: corrosion resistant stainless steel sheeting, for marine applications, is one example. Tubing, canisters, bowls, buoys, spheres and part of spheres available on the market can be modified and joined to make the vessel. The apparatus may also be made by any of or a combination of stamping, rolling, extrusion, moulding, casting, forging or machining of wood, metals, sheeting, or polymers. Any other suitable fabrication method can be used. Joining can be done by welding or other fastening methods, for example, rivets. However, a streamlined fluid dynamic profile, hydrodynamic or aerodynamic, is advantageous for low drag. Materials as well as joining materials and methods suitable for high vibration equipment are known to one skilled in the art and are hereby recommended, depending off course on the specific application parameters.

Neutral or positive buoyancy of the apparatus in ambient fluids can be used to eliminate or manage the mechanical and gravitational loads associated with the mass of the apparatus during oscillation; this can be achieved by attaching buoyant materials directly to the propulsor or by double walled, cored construction enclosing a medium whose density is lower than that of the ambient fluid; helium or hydrogen could be used for operation in a gaseous atmosphere for example. Expanded polymer foams such as polystyrene and polyurethane are examples of coring that can be used to achieve a desired buoyancy level in liquid fluids such as water. When not in use, a water based buoyant oscillating propulsor of long stroke could automatically float to the shortest distance from its craft, at the top of stroke position; this would lessen the risk of propulsor damage by collision with obstacles in the water. A vessel in the form of a segment of sphere or cylinder with a cutout or opening, as illustrated in FIGS. 1 to 5, admits ambient fluids upon submersion, for example in water. Acceleration of the vessel along or in the plane of section SP of its opening, illustrated by stippling in drawings of this disclosure, followed by a sudden stop causes the accelerated water to be ejected through the opening, along the curvature of the inner concave surface; reversal of the actuation stroke causes a similar ejection stream; water is also ejected from the opening as the vessel is accelerated; the direction of the cyclical ejection streams thus created is influenced by the size of the opening; the wider the opening the more parallel the cyclical ejection streams become and the greater the thrust; at an opening width about the size of the sphere diameter, the ejection streams become more parallel and thrust nears maximum value; cutting the opening width past the middle of the sphere shape, results in diverging ejection streams (FIG. 5). The volume of fluid enclosed and ejected is also reduced as the segment of sphere or cylinder is reduced.

The size reduction results in reduced thrust. Along the convex surface, cyclic acceleration of ambient fluids contribute to fluid flow into and past the implement. Ambient fluids are admitted into the implement through the sides as shown by curved arrows, in FIGS. 1, 4 and 4A. Further admission of fluids may occur through any edge of the opening not ejecting fluid, depending on oscillation frequency. The geometry dynamics disclosed provide conversion of fluid power into thrust, within the rules of fluid dynamics pertinent to each context. It would be obvious to one skilled in the art to provide a variety of geometrical shapes without departing significantly from the scope of the present invention. While I believe the implement operates in the manner described above and as will be described further on I do not wish to be bound by this.

The apparatus can be held and actuated by hand motion or placed in a guide for actuation; the rocking and rolling motion of a craft to which it is attached may also actuate it. Advantageously, a handling stick, for reciprocating actuation, can be joined to the implement at about the mid-points of the length and the diameter, for example. This construction allows a balanced movement when the assembly is reciprocated up and down or swiveled from side to side. Alternatively, handling sticks may be joined to the ends of the cylinder or to any cylinder location convenient and effective for operation. The sticks can be made out of tubing or bar of metal, polymer or composites; any other material suitable for the context of use can be utilized for construction of the apparatus of this disclosure. Examples of criteria for suitable materials include fatigue and corrosion resistance, durability, ease of fabrication and other characteristics pertinent to the fluid and context of use.

MODES FOR CARRYING OUT THE INVENTION

For purposes of clarity and brevity, features whose function is the same or basically the same will be identified in each FIG. or embodiment by a prefix of the FIG. number the variant feature appears in, followed by the feature number, the feature number being the same for all variants.

Basic Embodiments—FIGS. 1-4

Figure 1:
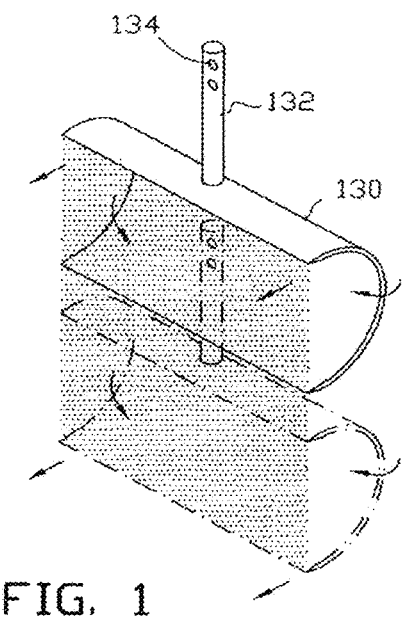
FIG. 1 is a perspective view of a segment of cylinder, showing the plane of oscillation in stippling, coplanar with the section plane SP of the vessel's opening.

FIG. 1 illustrates one embodiment of the oscillating propulsor of this disclosure: a curved body 130, having a convex outer, leading surface, and a concave inner, trailing surface. The convex outer surface is the leading surface when the implement propels through ambient fluids. Conversely, the concave inner surface is considered the trailing surface. The convex outer leading surface is securely connected to the concave inner trailing surface, advantageously in a substantially concentric manner, to define a vessel open to ambient fluids.

Whilst this structure is inherent for constructions that use sheeted materials, such as tubing and spheres, the reason for this distinction will become evident as further embodiments of the oscillating propulsor are disclosed hereafter. This embodiment is designed for hand operation to propel fluids and produce thrust upon reciprocating animation or actuation, as shown in phantom lines; ambient fluids are accelerated and ejected from the curved body 130 at the beginning and end of each stroke, as indicated by straight arrows, to propel the apparatus and the ambient fluids in opposite directions.

Apparatus diameter can be advantageously designed to fit the operator's hands. A strap or handle may be installed for ease of handling. The curved body 130 can also be guided by a sliding mechanism or by an engaging channel, for ease of manual operation. This embodiment can be used as a fluid mixer and could be remotely actuated by electromagnetic fields much like a magnetic stir bar, propeller or the likes; it can also be used as a thruster in boating and swimming, where a buoyancy core can be sandwiched in the space between the convex surface and the concave surface, similar to the pressure chamber 1152 described further in the embodiment of FIG. 11. Alternatively the buoyancy core can be attached externally, advantageously in a low drag shape.

Figure 17:
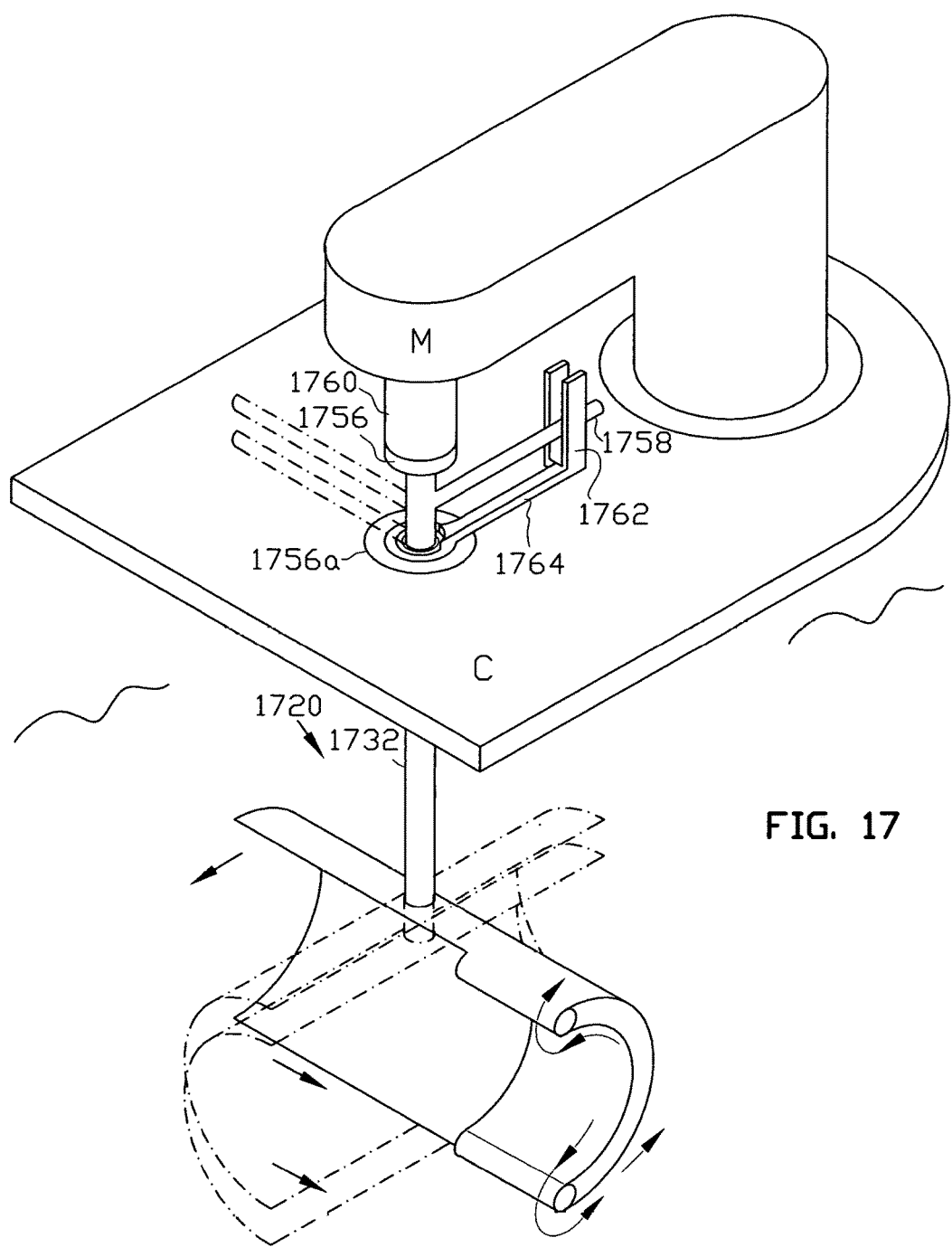
FIG. 17 is a perspective view of a thrust vectoring embodiment of the oscillating propulsor, with part radiused trailing edges to illustrate reverse propulsion.

The trailing edge 13 of the vessel opening is advantageously tapered to a fine edge as localized fluid convection between the convex surface and the opening can result from the reciprocating movement, especially under static conditions; fluid convection is more pronounced with thicker and radiused edges and can be utilized, if desired, to cause a reverse propulsion of fluid flow from the vessel opening and towards the convex leading surface, albeit with a reduction in thrust (FIG. 17 curved arrows). Conversely, it is preferable that any intake openings and inlets of the implement be radiused to promote fluid flow into the apparatus. Thus the sides of the part cylinder of FIG. 1 are preferably radiused, particularly if of a thick section.

In another embodiment of the oscillating propulsor in FIG. 1, the curved body 130 is secured to an actuating member 132. The actuating member 132 may be fitted with an aperture 134 for fastening to a motive power source such as a reciprocating engine or a reciprocating mechanism, for example (not shown). For example, the apparatus can be animated by bolting the actuating member 132 to the conrod or an extension thereof of a reciprocating engine. The actuating member 132 can be mechanically coupled to a motive power source by any other safe and suitable means. Where animation of the apparatus is provided by muscle power, such as in leisure or sport crafts, the actuating member 132 can be made to a length ergonomically efficient for the operator, as dictated by mechanical advantage leverage requirements.

Figure 2:
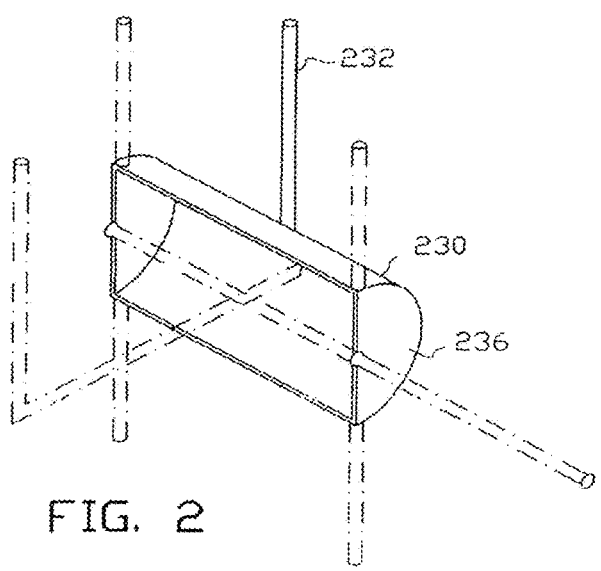
FIG. 2 is a perspective view of a curved body with flat end caps showing alternative attachments of the actuating member.

The actuating member 132 is attached to the curved body 130 in a position suitable for animating the curved body 130; examples of attachment to the convex surface and alternatively to the concave surface or both, and to the ends are shown in FIG. 2, alternatives being indicated by phantom lines. FIG. 3 illustrates another alternative attachment of the actuating member 332 across the curved body 330. Movement of the actuating member 332 can be guided by an embracing sleeve, bushing, rocker levers or roller assembly secured to a supporting base or craft: a square embrace can be used to fix thrust orientation whereas a round, rotatable embrace can be used to control thrust direction, for steering and maneuvering, for examples.

Figure 1A:
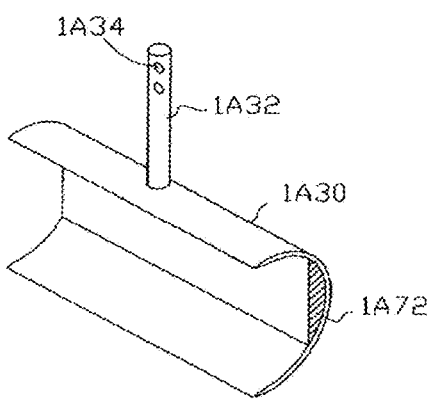
FIG. 1A is a perspective view of the embodiment of FIG. 1 fitted with an impulse plate.

In FIG. 1A, an impulse plate 1A72 is securely attached to the concave inner trailing surface of the curved body 1A30. The impulse plate 1A72 converts some of the energy in moving fluid into a propulsive impulse before ejection from the concave surface. The impulse plate 1A72 may be provided in the form of light materials to render the propulsor buoyant. Examples of suitable materials include expanded polystyrene, polyurethane, wood or other suitable buoyant materials. The actuating member 1A32 may be fitted with aperture 1A34 for fastening to a motive power source such as a reciprocating engine, for example (not shown).

As illustrated in FIG. 2 the curved body 230 may be reinforced with a flat end cap 236. The flat end cap 236 provides an alternative attachment structure for the actuating member 232. The flat end cap 236 can also be used to attach the apparatus to a base or craft.

As illustrated in FIG. 3 the curved body 330 may also be reinforced with a spherical end cap 338. The spherical end cap 338 maximizes thrust generation from fluid leaving the apparatus with a longitudinally directed momentum, as would happen when the oscillating propulsor is swiveled end to end. A swivel mechanism, affixed to a craft, can be hinged on the actuating member 332 by fastening through aperture 334, for example. If fixed to a ship, the rolling movement of the ship at sea would provide a similar motion to generate thrust from wave action. The heaving motion of a ship at sea would also generate thrust from the apparatus by reciprocating, up and down movement.

When reduced to minimum length, the embodiment shown in FIG. 3 becomes a portion or segment of a sphere, as illustrated in FIG. 4. The spherical end caps 438 fuse to form a segment of a sphere. The embodiment can be reciprocated via the actuating member 432 by fastening to a motive power source through aperture 434. The geometry of the embodiment shown in FIG. 4 is consistent with the basic concept of a curved body as previously disclosed and is thus regarded as such herein. Upon reciprocation along the vertical axis of the actuating member 432, ambient fluids are ejected as shown by the top and bottom sets of straight arrows; ejection of fluids from the vessel induces an inflow of replacement ambient fluids, as illustrated by the curved arrows. The apparatus and the ambient fluids are urged or propelled in opposite directions.

In FIG. 4A, the segment of a cylinder disclosed in FIG. 1 is bent into the curved body 4A30, of a toroidal shape. The actuating member 4A32 may be fitted with aperture 4A34 for fastening to a reciprocating mechanism, for example (not shown). The ring shape of the curved body 4A30 provides the advantage of a strong structure, additionally reinforced by the actuating member 4A32. Fluid acceleration and ejection occur at both the inner and the outer perimeters of the torus as shown by the two sets of arrows at the top and bottom. The torus opening also serves as a fluid inlet and thrust augmenter given that fluids ejected from the curved body 4A30 can entrain or induce mass flow through the torus opening as illustrated by the two arrows linked by a broken line. Fluid is admitted into the curved body 4A30 through the sides as shown by curved arrows.

Embodiment Dynamic Geometry—FIG. 5

The geometry of the curved body of the oscillating propulsor shows a remarkable influence on the thrust generated upon oscillation in water (FIG. 5). The direction of fluid ejection from the curved body varies with the transverse profile as indicated by arrows. Whilst an optimum sphere segment size in the range 0.5-0.6 diameter fraction is indicated in FIG. 5, it would be obvious to one skilled in the art that the optimum value may change with changes in fluid properties and dynamics; for example, it is known that the speed of fluid flow over a sphere affects the location of flow separation and start of turbulence on the sphere, the location migrating down flow as speed increases; these factors in turn influence drag and thus would also influence the efficiency of propulsion generated. Thus, whilst a hemisphere may clearly demonstrate the principle of the apparatus herein disclosed, the optimum geometry may be dependent on the nature of the fluid at hand and the context of use. It would be obvious to one skilled in the art to provide a variety of geometrical shapes to vector fluid flow over and out of the apparatus without departing significantly from the scope of the present invention.

Embodiments with Drag Reduction Attachments and Features—FIGS. 6-11

Embodiment Making Use of Hydrophobic Materials

To reduce resistance to movement or drag, the oscillating propulsor surfaces may be coated with or made out of fluid phobic materials. Examples of materials suitable for water applications include polymers, silicon coating, waxes and environmentally safe oils. Advances in nanotechnology have ushered the era of superhydrophobic materials with promises of drag reduction in marine propulsion applications; coating the oscillating propulsor with these superhydrophobic materials could reduce drag and increase efficiency of propulsion.

Figure 6:
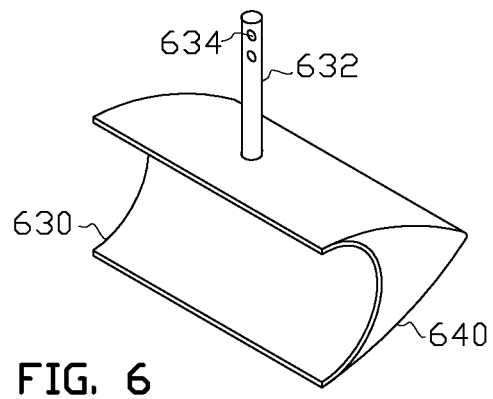
FIG. 6 is a perspective view of an oscillating propulsor fitted with a drag reduction member.
Figure 6A:
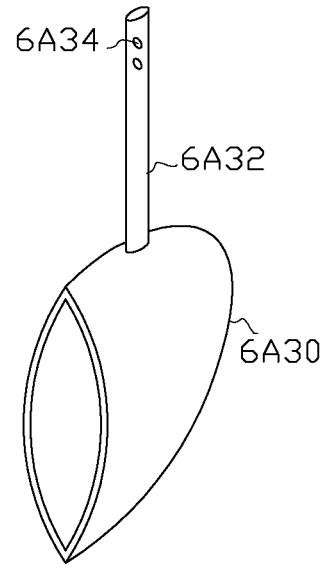
FIG. 6A is a perspective view of an oscillating propulsor shaped for reduced drag.
Figure 6B:
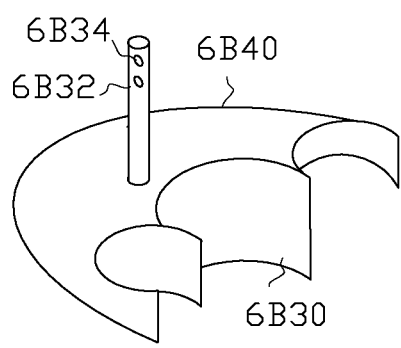
FIG. 6B is a perspective view of a horizontal compound oscillating propulsor fitted with a drag reduction member.
Figure 6C:
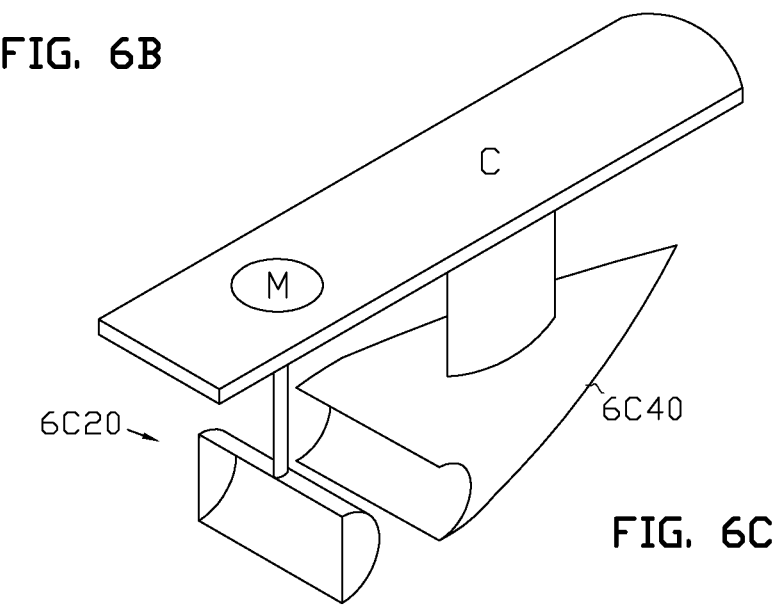
FIG. 6C is a perspective view of a craft fitted with a drag reduction member fore of an oscillating propulsor.

Embodiments Making Use of Fluid Dynamic Shape to Reduce Drag—FIGS. 6-6C

In FIG. 6A, the curved body 6A30 is advantageously fabricated as an elliptical, airfoil/hydrofoil or any other shape capable of minimizing drag both in the oscillation plane and the plane of displacement in ambient fluids. Actuating member 6A32 with aperture 6A34 may be provided as previously discussed. In FIG. 6, a fluid dynamic profile is provided to the oscillating propulsor by attaching a drag reduction member 640 onto the curved body 630. The drag reduction member 640 may also be built in integrally into a single propulsor, akin to FIG. 6 or into a compound propulsor as illustrated in FIG. 6B. In FIG. 6B drag reduction member 6B40 is provided in horizontal orientation for side to side reciprocation or for swivel use, as detailed further below. In the embodiment shown in FIG. 6C, the drag reduction member 6C40 is separate from the propulsor 6C20 and mounted on craft C fore of the propulsor 6C20. The drag reduction member 6C40 can be provided as the hull of craft C or it may advantageously be provided separate and made out of buoyant materials for floatation of the craft. A propulsive surface may also be provided on the drag reduction member 6C40 in the form of a concave trailing surface similar to that of the propulsor 6C20. As described further on, lubrication of movement may also be provided, advantageously at the tip of member 6C40. Motor M on craft C animates the propulsor 6C20 and may also animate the craft C and drag reduction member 6C40, by reactive momentum.

In another embodiment, the arrangement in FIG. 6C is provided as a propulsion module; the craft C in FIG. 6C then becomes simply a mounting plate, for fastening the propulsion module to a craft (not shown). Lubricant provision to the fore of drag reduction member 6C40 may be provided as discussed further under FIGS. 9-11, to further reduce drag.

As illustrated in FIG. 7, oscillating propulsor drag may also be reduced by cutting or providing an intake opening 742 across the leading convex and trailing concave surfaces of the curved body 730. This embodiment provides the advantage of reduced drag at higher travel speeds as the incoming rush of fluid provides a dynamic seal against loss of thrust through forwards leakage. The size of the opening can be advantageously set to mitigate the frontal stagnant pressure zone associated with sphere fluid dynamics; the frontal stagnant pressure zone reportedly extends over a good half of the sphere diameter and is known to one skilled in the art.

The actuating member 732 may be fitted with aperture 734 for fastening to a motive power source. In this embodiment the resulting propulsor is essentially a paired assembly of arcuate surfaces or curved plates. In partially submerged operation, this embodiment can be reduced to the structure of a single curved plate that is still capable of propelling fluids, with the advantage of even lower drag.

In the embodiment shown in FIG. 7A the intake opening 7A42 is provided as a plurality of slots cut into the curved body 7A30; this embodiment enhances structural integrity, particularly for large size oscillating propulsors or where high mechanical strain is anticipated. Actuating member 7A32 may be fitted with aperture 7A34 for fastening to a motive power source. FIGS. 7B-7C illustrate intake openings 7B42, 7C42, 7D42 for drag reduction on the part sphere embodiment shown in FIG. 4. In FIG. 7C the intake opening 7C42 is provided as a plurality of apertures. FIG. 7D illustrates an alternative side location of the intake opening 7D42.

Actuating members 7B32, 7C32, 7D32 may be fitted with apertures 7B34, 7C34, 7D34 for fastening to a motive power source such as a reciprocating engine, for example (not shown).

Figure 8:
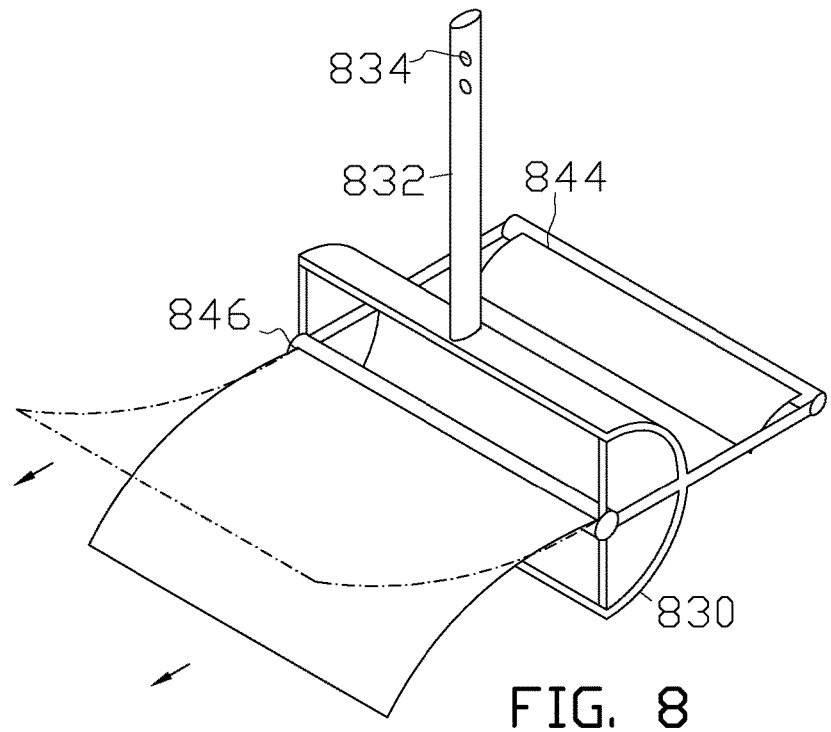
FIG. 8 is a perspective view of an oscillating propulsor fitted with fore and aft fins.

As shown in FIG. 8 drag reduction may also be provided by securely connecting a fore fin 844 to the curved body 830; The fore fin 844 is designed to deflect the frontal stagnant pressure zone associated with sphere fluid dynamics. A fin installed on a craft, fore of the curved body would function in a similar way, within the constraints of applicable fluid dynamics. The fore fin 844 acts as a first stage fluid accelerator that feeds into the second stage accelerator provided by the curved body 830. An aft fin 846, may also be attached to the curved body 830.

Figure 8A:
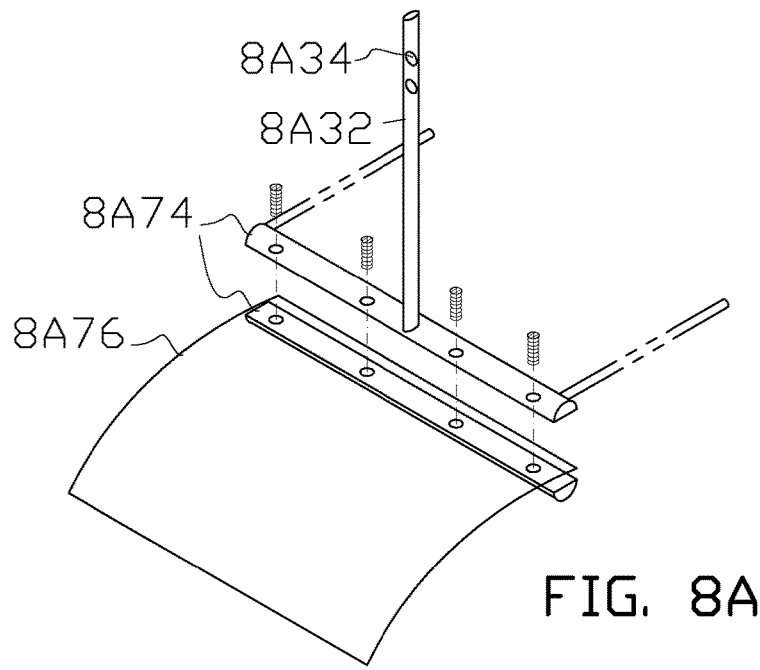
FIG. 8A is an exploded view of details of construction of fore and aft fins of FIG. 8.

Details of one method of construction for the tore fin 844 and the aft fin 846 are shown in FIG. 8A: a resilient, flexible sheet 8A76 is sandwiched between paired half cylinders drilled with holes for fastening; fasteners, exemplified here as four screws or bolts, are used to assemble the resilient sheet 8A76 and the paired half cylinders, along the projection lines, to produce a fin with a cylindrical head 8A74. Polymer, composite, metal or wood sheeting are examples of material that can be used to make the resilient sheet 8A76. Rods and tubing of similar materials can be used to make the cylindrical head 8A74.

For example, a working propulsion fin can be constructed by attaching a 1 mm thick resilient vinyl sheet, 30 cm by 30 cm square, along and normal to the center line of a 30 cm long rod of 1 to 2 cm diameter. The size and thickness of the sheet and dimensions of the rod can be scaled up or down depending on the amount of power available to flex the resilient sheet in the fluid at hand. The angle between the cylindrical head 8A74 and the resilient sheet 8A76 can be filled with a flexible polymer to smoothly blend or fillet the radius of the cylindrical head 8A74 into the resilient sheet 8A76. Actuating member 832, 8A32 may be fitted with aperture 834, 8A34 for fastening to a motive power source.

In addition to drag reduction, the fore fin 844 and the aft fin 846 also provide the advantage of additional thrust, particularly at low travel speeds. Upon oscillation, the cylindrical head 8A74 accelerates ambient fluids, which are further accelerated by the flexed alternating curvatures of the resilient sheet 8A76, as illustrated in phantom lines. Ambient fluids are propelled along direction of arrows shown in FIG. 8, urging the fins 844, 846 and any attachments thereto in the opposite direction. The dynamics of marine fin propulsion are known to one skilled in the art.

Figure 9:
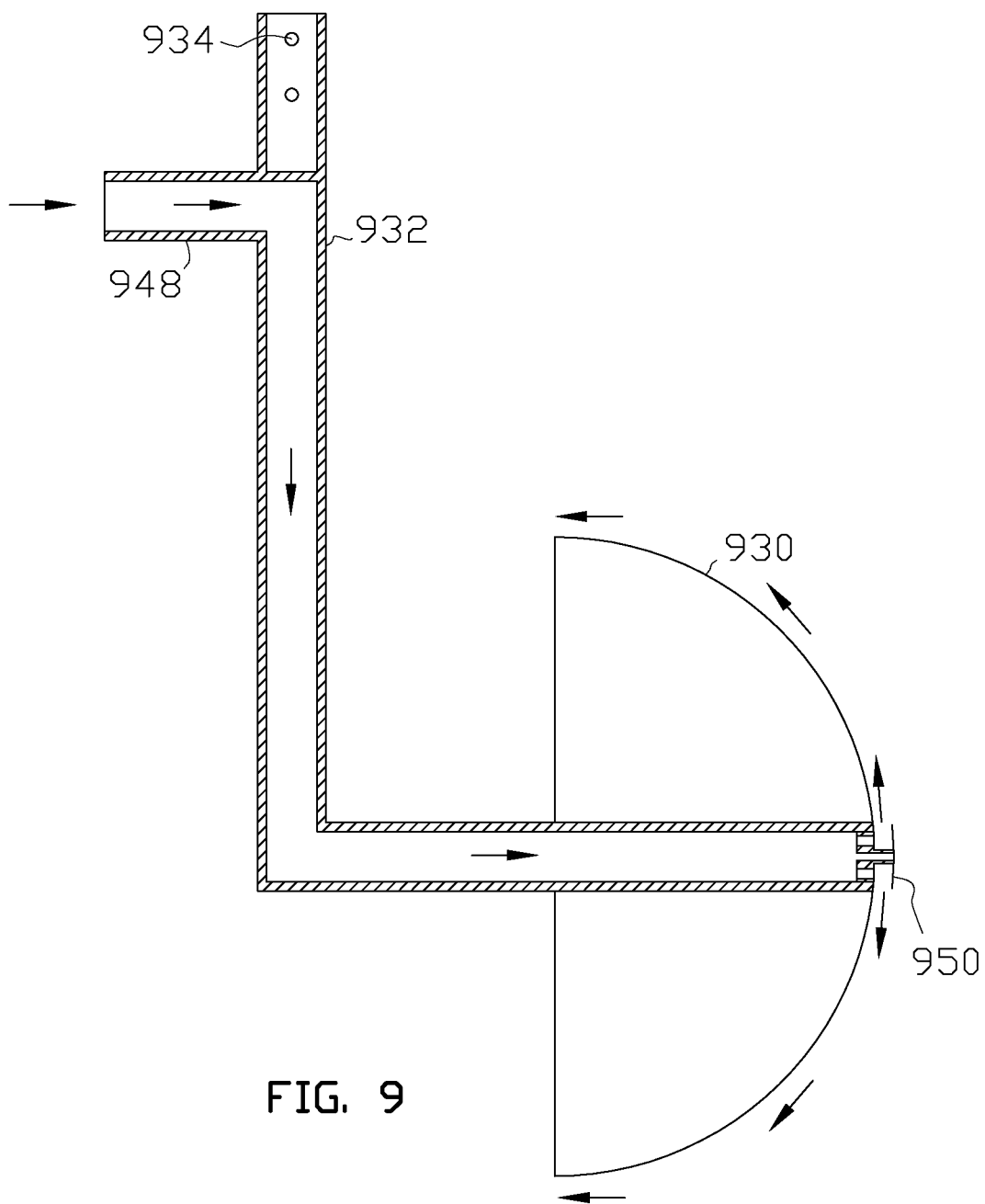
FIG. 9 is a section view of an oscillating propulsor fitted with lubricant inlet and outlet for provision of a lubricant cavity over the apparatus.
Figure 10:
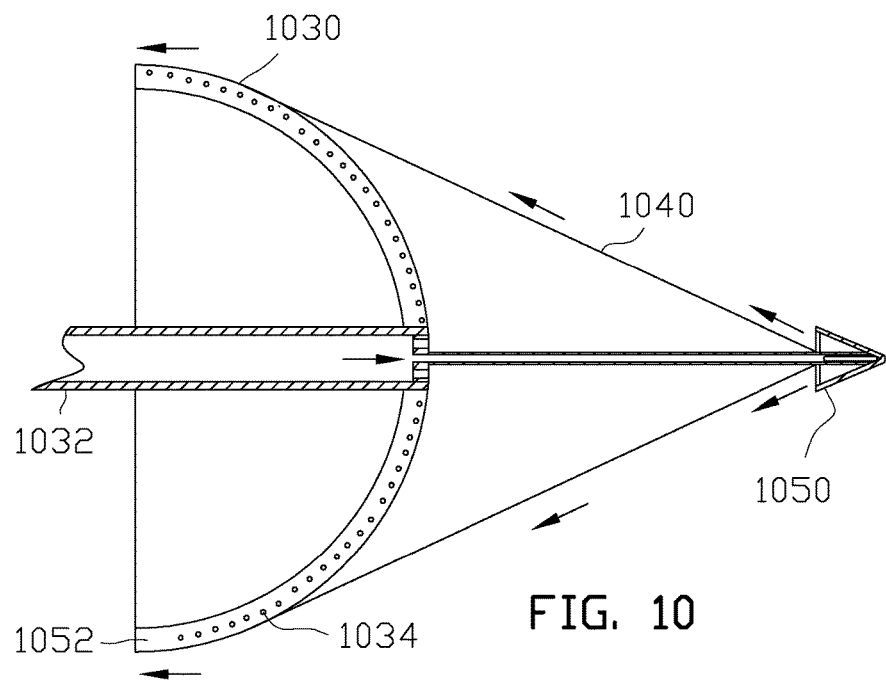
FIG. 10 is a section view of an oscillating propulsor showing a lubricant pressure chamber with apertures, lubricant outlet and drag reduction member.
Figure 11:
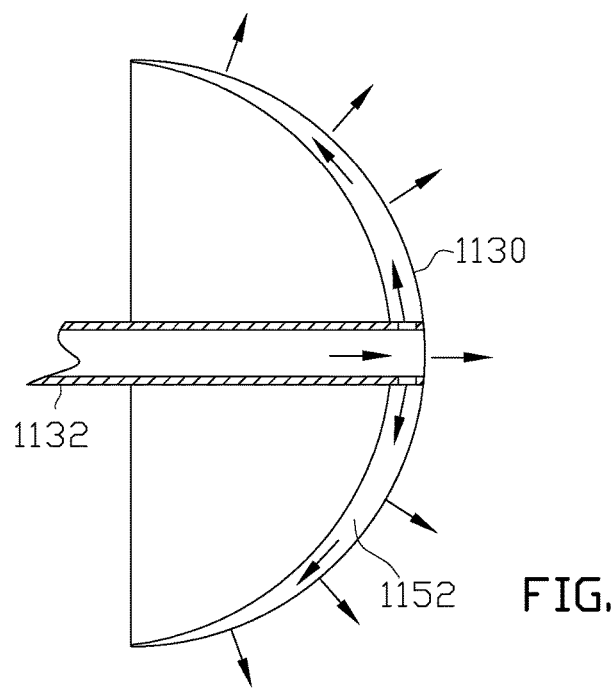
FIG. 11 is a section view of an oscillating propulsor showing lubricant delivery to pressure chamber and egress to leading surface through the apertures as depicted in FIG. 10.

Embodiments Making Use of Lubricant Cavity to Reduce Drag—FIGS. 9-11

Cavitation over the oscillating propulsor can occur at high oscillation frequencies and travel velocity, for example in water. Alternatively, a lower density fluid or fast moving fluid may be coated over the oscillating propulsor's surfaces to reduce drag in the ambient fluids. The lubricant cavity provision means may be integrated with the propulsor or they may be installed independent of the propulsor, for example on the craft C or the drag reduction member 6C40 previously described for FIG. 6C; FIG. 9 shows a section of an oscillating propulsor fitted with the actuating member 932 fluidly connected to a lubricant inlet 948 and a lubricant outlet 950. A pressurized fluid such as air or water is conveyed, as depicted by arrows, to lubricant outlet 950 from lubricant inlet 948 and through actuating member 932. The pressurized fluid exits lubricant outlet 950 radially to coat the convex leading surface of the curved body 930 and thus lubricate movement of the apparatus in ambient fluids. Supply of pressurized fluid to the lubricant inlet 948 has to allow for the reciprocating movement of the oscillating propulsor; this can be achieved, for example, by way of a flexible hose or moveable seals.

Alternatively the lubricant cavity supply system could be installed in a fixed position, at the leading tip of a low drag member (FIG. 6C) fore of the oscillating propulsor, for example, to coat the oscillating propulsor with lubricant.

As shown in FIG. 10 the lubricant cavity may also be provided by way of an integral double walled pressure chamber 1052, located between the convex outer leading surface and the concave inner trailing surface of the curved body 1030. The pressure chamber 1052 is perforated with at least one aperture 1034, for delivery of pressurized fluids from the actuating member 1032 to the convex outer leading surface of the curved body 1030. FIG. 11 illustrates movement and delivery of pressurized fluid, indicated by arrows, from the truncated actuating member 1132, to the pressure chamber 1152 and onto the convex outer leading surface of the curved body 1130, through apertures 1034 (shown in FIG. 10).

Alternatively, as shown in FIG. 10, the pressurized fluid may be supplied through lubricant outlet 1050, fore of the curved body 1030; in this embodiment the pressurized fluid is directed in a cone shape over the leading surface of the curved body 1030, as indicated by arrows. In embodiments with a drag reduction member 1040, as previously exemplified in FIG. 6, the pressurized fluid can be directed over the surface of the drag reduction member 1040. The actuating member 1132 may also be lubricated similarly, with or without a double wall pressure chamber 1152.

Promotion of Formation of Lubricant Cavity

The surface of the oscillating propulsor may be configured or constructed to promote natural formation of a reduced viscosity boundary layer of the ambient fluid as provided, for example, by cavitation phenomena in water; examples of such surface construction include sandblasting, dimpling and microstructures that reduce surface friction with ambient fluids. The surface of golf balls and at least one soccer ball, known as the Jabulani, are engineered to reduce drag by means of surface structures like dimples, nibs and ridges. Mechanical vibrations from the motive power source and reciprocating mechanisms can also promote cavitation on the propulsor and the supporting base, reducing drag. It is anticipated that the oscillating propulsor continue to function under supercavitation conditions because admission and acceleration of a high speed volume of fluid into the concave surface before ejection could enable temporary compression of affiliated gases before ejection of same in a forceful expansion.

Operation—FIGS. 1, 12-14, 15-19

The apparatus of this disclosure can be operated manually like oars or paddles with the additional advantages of reactive propulsion from up and down stroking as well as swiveling action. Reciprocating displacements of the apparatus accelerate fluid admitted therein before ejecting the same from the trailing concave surface at the beginning and end of each stroke. The ejection of fluid imparts a reactive propulsive momentum to the oscillating propulsor and attachments thereto. Ejection of fluid from the apparatus causes admission of ambient fluid for the next stroke and so on as long as the apparatus is oscillated or reciprocated.

From a static position, thrust may be generated mostly by reaction of the oscillating propulsor to the mass and velocity of fluid ejected; as fluid flow over the oscillating propulsor increases, the momentum of the fluid may also be transmitted to the oscillating propulsor. Thus, as displacement or travel speed increases so does thrust increase; however, the increase in speed is limited by the drag of the oscillating propulsor. Embodiments with drag reduction attachments and features, as previously disclosed, can be used to mitigate this limitation.

For any given fluid and embodiment of the apparatus, the thrust generated is influenced mostly by fluid capacity of the oscillating propulsor, oscillation or stroke frequency, stroke length and displacement velocity. The apparatus may be attached to a craft to provide propulsion for travel. Oscillation of the apparatus can be effected in linear mode, up and down strokes, as depicted in FIGS. 1, 12; operation can also be effected in radial mode, side to side or swivel action, as shown in the levers of FIGS. 13, 14 and as illustrated further under industrial applicability. In these FIGS., the extreme position of the oscillating propulsor is shown in phantom lines. Arrows indicate direction of ejection of fluid from the oscillating propulsor. Reaction movement of the oscillating propulsor is in opposite direction to the direction of fluid ejection. A reciprocating engine can be coupled directly to the oscillating propulsor; this would require connection to the conrod, the piston or an extension thereof, eliminating thus the flywheel, crankshaft and other components normally associated with a rotary engine. Such a simplified and lighter engine could boost efficiency and fitness of the present invention in the propulsion market.

Alternatively, rotary to reciprocating motion converters can be used with current motors or engines to drive the oscillating propulsor. Examples of useable motion converters include crank mechanisms and Scotch Yoke devices. Electric, fluid driven and wind oscillators may also be used to drive the oscillating propulsor. The actuating member may be guided through bushings, roller guides, channel, or rocker levers as used in some reciprocating saws. For leisure, sports and in general utility applications, motive power can be provided by an operator's muscles (FIGS. 16, 19), as further described below.

INDUSTRIAL APPLICABILITY

Fluid Pumps, Crafts—Watercrafts, Aircrafts

A general application of the oscillating propulsor is in displacement of fluids, be it in enclosed casings as used for pumps or in the open as used for mixing, aeration of fluids, and ventilation, for examples. Attached to a craft, the apparatus can provide propulsion means for the craft's displacement in and about fluids, travel or transportation, by wave power or motive power on board.

Watercrafts

An example of a watercraft propelled by the apparatus is illustrated in FIG. 12. The oscillating propulsors 1220, driven by motors M1, M2 reciprocate up and down, taking in water, accelerating it and ejecting the same rearwards of the watercraft; this water ejection imparts a reaction propulsive momentum to oscillating propulsors 1220 and the craft to which they are attached. The direction of water ejection is shown by the bottom arrows; the craft's direction of travel is opposite that of water ejection, as shown by the top arrow. Oscillating propulsors may be arranged in a tandem or multi-stage system as shown in FIG. 12; in one embodiment the foremost placed propulsor 1220d acts as a first stage fluid accelerator for the aftmost propulsor 1220e. Propulsion is enhanced and speed of the craft increases, which results in a loop feedback on fluid ejection velocity and so on. Craft's velocity increases steadily, limited mostly by available power and drag.

An alternative multi-prop assembly may be provided by arranging 3 or more propulsors 1220a, 1220b, 1220c on the actuating member 1232: propulsor 1220a is mounted fore of the smaller propulsors 1220b, 1220c so as to feed ejected ambient fluids into the intakes of propulsors 1220b, 1220c. During operation the apparatus also works as an energy harvester like propellers do by converting the energy in fluid flow into mechanical work. FIG. 13 illustrates an oscillating propulsor fitted with the actuating member 1332 levered about the fulcrum 1354, for manual or powered operation. The fulcrum 1354 can be attached to the craft or device to be propelled. Reciprocating displacements of the lever's input arm, as shown by the top arrows, causes reciprocating strokes of the curved body 1330 at the output arm; when reciprocated, the curved body 1330 admits ambient fluid, accelerating it and ejecting the same as depicted by the bottom arrows.

In this embodiment there is also a centrifugal acceleration component caused by the arcuate swivel path; the centrifugal ejection is indicated by the bottommost arrows and it may have a tangential bias, depending on stroke length and frequency. Fluid ejection imparts a reaction propulsive momentum to the oscillating propulsor and attachments thereto. The oscillating propulsor and any attachments thereto are urged or propelled in a direction opposite that of fluid ejection.

FIG. 14 shows a stylized watercraft fitted with a high mechanical advantage lever provided by the actuating member 1432, about the fulcrum 1454. Animation of the oscillating propulsor 1420 by motor M oscillates the apparatus in swivel mode, as shown in phantom lines. The oscillating propulsor 1420 takes in water, accelerates and ejects the same rearwards of the watercraft, as indicated by bottom arrows; this water ejection imparts a reaction propulsive momentum to the oscillating propulsor 1420 and the craft to which it is attached. Direction of travel of the craft is opposite that of water ejection, as shown by the top arrow.

Figure 15:
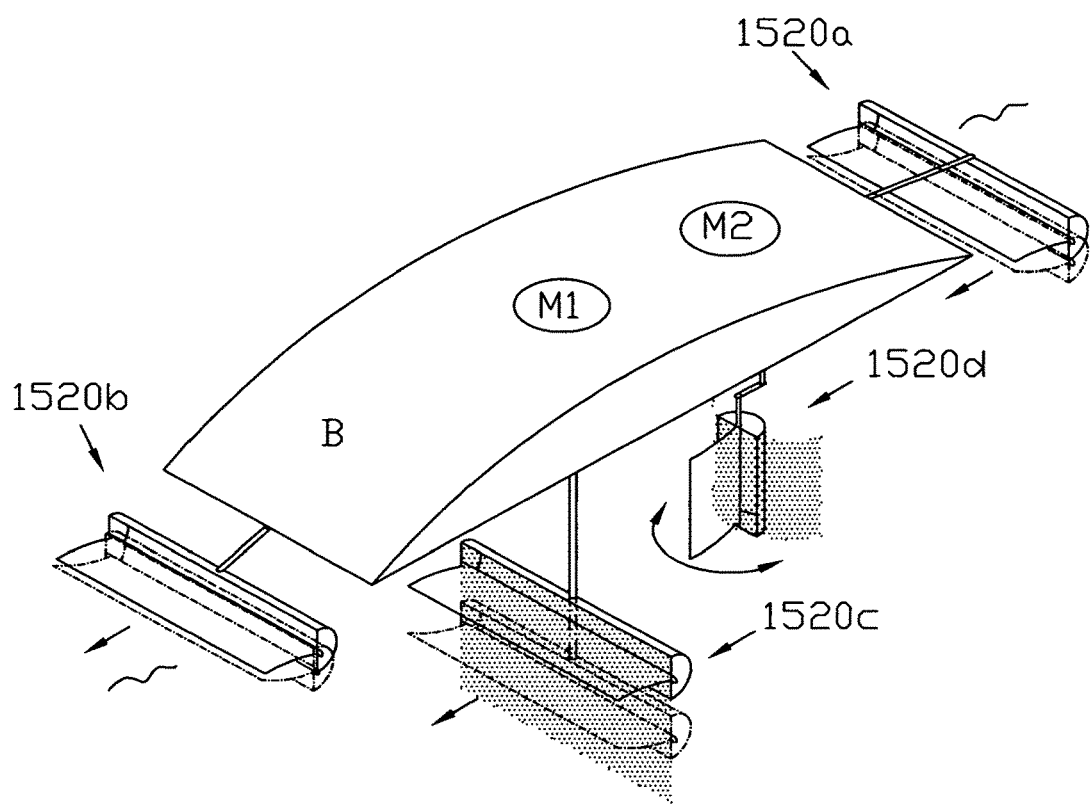
FIG. 15 is a perspective view of a watercraft propelled by the action of and the reaction to a reciprocating motive power source on the oscillating propulsor: plane of vessel's opening and oscillation is illustrated by stippling.

Novel craft concepts, propelled by the oscillating propulsor, are illustrated in FIGS. 15-19. Whilst for illustration purposes these embodiments will be described with reference to watercrafts and aircrafts, the concepts relate generally to fluids and fluidized substances and can be adapted accordingly. In FIG. 15, a buoyant base B is fitted with oscillating propulsor 1520a at the front, in a horizontal rearwards thrusting position and similarly fitted with oscillating propulsor 1520b at the rear, cooperatively secured to the base B. Motor M1 is supported on base B and drives oscillating propulsor 1520c. Motor M2 is rotatably attached to base B and drives oscillating propulsor 1520d, in a vertical position.

Upon operation, oscillating propulsor 1520c thrusts water rearwards, along indication arrow, urging the craft forward.

The reciprocating motion of oscillating propulsor 1520c by motor M1 causes a reactive up and down motion of the base B thus animating front and rear oscillating propulsors 1520a and 1520b, as shown in phantom lines and thrust indication arrows.

Propulsion efficiency is maximized by using both the action of and reaction to the reciprocating motive force. Steering and additional thrust is provided by oscillating propulsor 1520d, reciprocated by motor M2 in a radial swivel, as shown by the arc with two arrows. Alternatively, oscillating propulsor 1520c can be installed rotatable to the base B or a conventional rudder can be installed on the craft, for steering. Recovery of reaction momentum and its application to propulsion is an advantage of this embodiment.

The craft disclosed in FIG. 15 could be supported entirely by the oscillating propulsors to provide a hydrofoil type watercraft; in that case oscillating propulsors become propulsive hydrofoils, adaptable with adjustable thrust angle akin to current hydrofoil angle adjustment systems. Alternatively, oscillating propulsors with some buoyancy would provide a surface skimming craft. Buoyancy can be provided by coring, as previously described; in addition, the fore fin 844 and the aft fin 846 depicted in FIG. 8 could also be made out of buoyant materials like hydrophobic polymer foam sheets and mats.

Figure 16:
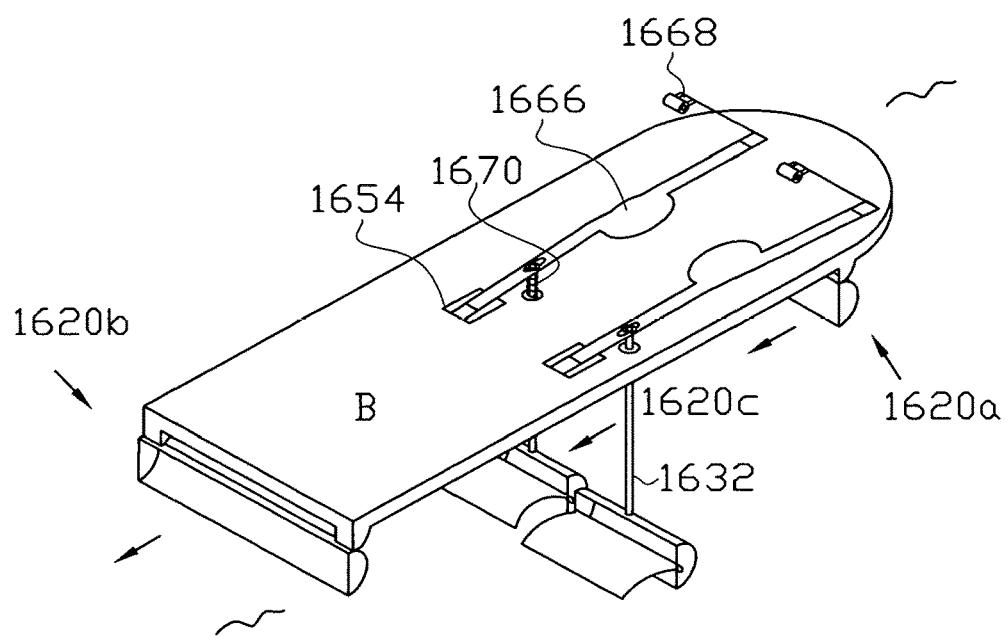
FIG. 16 is a perspective view of a muscle powered watercraft that can be propelled by the action of and the reaction to the reciprocating motive force of an operator.

A muscle-powered or man-powered watercraft propelled by means of the apparatus is exemplified in FIG. 16. A buoyant base B is fitted with oscillating propulsor 1620a at the front, in a horizontal rearwards thrusting position and similarly oscillating propulsor 1620b at the rear, cooperatively secured to the base B. At least one pedal 1666 is levered to the base B through the fulcrum 1654, to drive oscillating propulsor 1620c donwnward when depressed by foot, for example. Oscillating propulsor 1620c is slideably secured to the base by way of a square sleeve, embracing to the actuating member 1632. At least one handle 1668, hingedly connected to the pedal 1666 can be pulled by hand, for example, to power the upward stroke of the oscillating propulsor 1620c.

Alternatively, the upward stroke can be returned by a spring 1670, urging the pedal 1666 upwards. The reciprocating motion of oscillating propulsor 1620c by pedal 1666 and handle 1668 causes a reactive up and down motion of the base B, thus animating front and rear oscillating propulsors 1620a and 1620b. Operation of the oscillating propulsors thrusts water, as indicated by arrows to propel the craft in the opposite direction. Steering can be effected with a conventional rudder or by differential thrusting of twinned oscillating propulsors, as illustrated in FIG. 16.

Propulsion efficiency is maximized by using both the action of and the reaction to the reciprocating motive force of the operator. Other actuation systems can be used to operate this embodiment; examples of alternative actuation systems are described in U.S. Pat. No. 2,979,018 to Birdsall (1961) and in U.S. Pat. No. 3,236,203 to Bramson (1966).

Embodiment with Thrust Vectoring or Directional Control—FIGS. 15, 17

In FIG. 15, motor M2 can swivel about the base B to provide a directed or vectored thrust from oscillating propulsor 1520d, as needed, to control the direction of travel of the craft. A conventional rudder can also be used to steer the craft. An alternative embodiment for thrust vectoring, particularly advantageous where motors are fixed on a craft C, is shown in FIG. 17. The actuating member 1732 of oscillating propulsor 1720 is rotatably coupled to a motion transmitter 1760 of motor M through an advantageously lightweight, bearing 1756. A control arm 1758 is cooperatively secured at a first end to the actuating member 1732 and is straddled at the second end by the U-shaped guide or slot 1762 of a steering member 1764. The steering member 1764 is secured to bearing 1756a for advantageous rotation about the vertical axis of the actuating member 1732. Bearing 1756a is secured to the craft C and is slideably engaged to the actuating member 1732.

Alternatively, bearing 1756a can be fixed to the base of motor M to provide a propulsion cum steering assembly, detachable from the craft. This embodiment allows for rotation or steering of the oscillating propulsor 1720 while oscillating, as shown in phantom lines. One or more magnets (not shown) may be attached to the second end of the control arm 1758, opposite similar pole magnets on the guide 1762; this embodiment essentially provides a magnetic bearing that allows operation of the apparatus with reduced mechanical interference and associated noises; the control arm 1758 would be centralized in the U-shaped guide 1762 by mutual repulsion of the opposing magnets.

Other vibration dampening mitigation systems may be applied, for example rubber polymers. Steering can be effected by manual displacement of the steering member 1764 or by electric means like servo motors. Conventional steering devices, for example a steering wheel, can also be coupled to the steering member 1764.

The thrust vectoring system thus described can be used with embodiments of the present disclosure, as required; it can also be used generally for maneuvering and direction control in other oscillating systems and as active braking means when thrust is applied against the direction of travel to slow down or bring a craft to a halt. The control arm 1758 may be consolidated with the lubricant inlet 948 of the embodiment in FIG. 9 to provide a dual purpose conduit for lubricant delivery and steering control.

Aircraft

Figure 18:
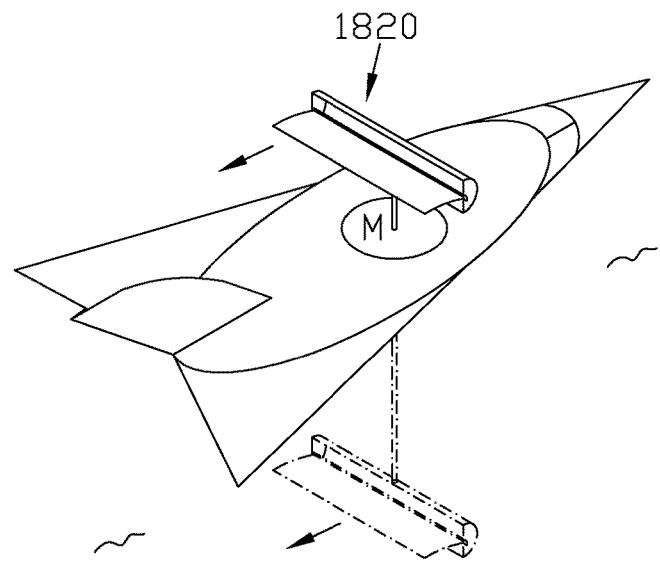
FIG. 18 is perspective view of a stylized aircraft propelled by the oscillating propulsor in air and in water.

Propulsion of an aircraft could be achieved by mounting and operating the apparatus on a craft as illustrated in FIG. 18. The oscillating propulsor 1820 can be installed for propelling air or can be fitted for submerged operation in water, as shown in phantom lines. The oscillating propulsor 1820 is actuated by motor M to thrust air rearwards as shown by top arrow; for submerged operation, shown in phantom lines, water is ejected rearwards, as shown by bottom arrow, to propel and lift the craft out of water; the oscillating propulsor remains submerged or parly submerged, while the craft flies in air.

This hybrid aircraft-in-water, propelled by water, provides the advantage of high thrust in water with some of the craft's weight supported by water. The lower drag of the craft in the air, compared to a similar size watercraft, is another advantage of this embodiment. The craft would also benefit from Wing-In-Ground effect, a phenomenon known to increase efficiency of lift. The craft of this embodiment could have some autonomy in full airborne flight when sufficient speed is attained to leave water and allow momentary flight by inertia of movement. Alternatively, both air and water propulsion systems could be installed and used as needed to provide a versatile hybrid water and air craft.

Figure 19:
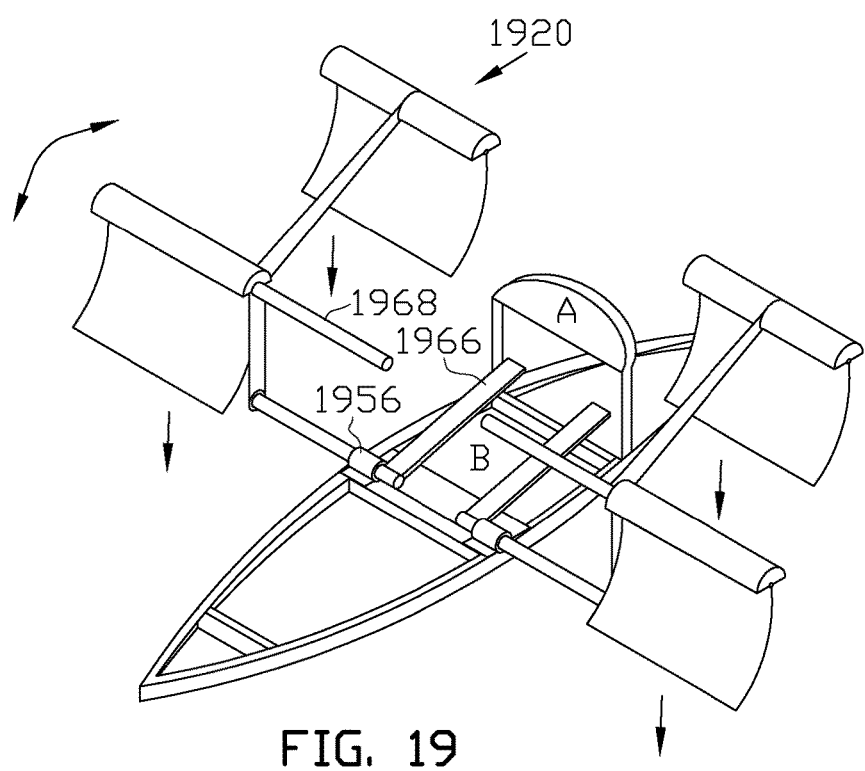
FIG. 19 is a perspective view of a muscle powered aircraft propelled by the oscillating propulsor.
Figure 1:
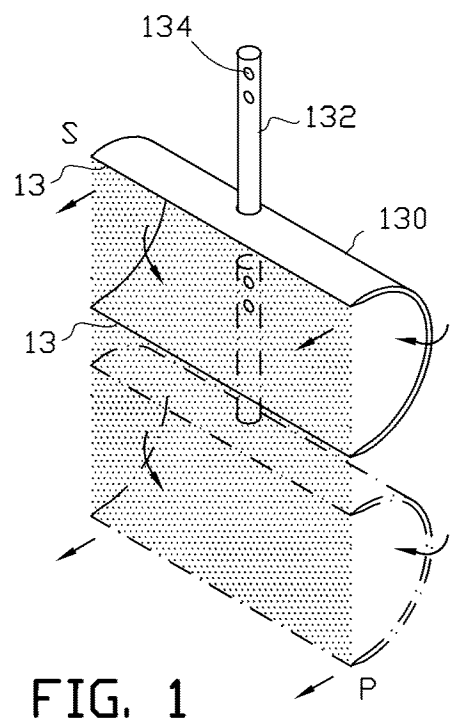
Figure 1A:
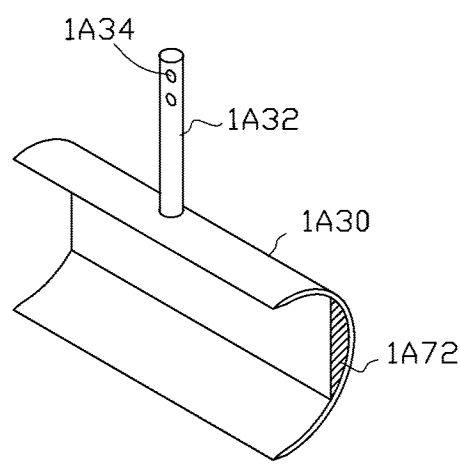
Figure 2:
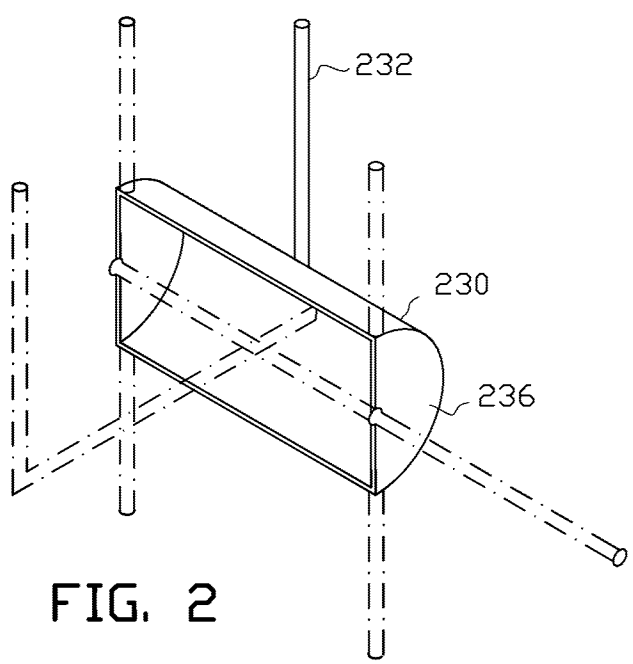

FIG. 19 illustrates an embodiment of a muscle or man-powered aircraft propelled by the apparatus. At least one lever system, having a pedal 1966 and a handle 1968 input arms, is secured at the fulcrum to base B through bearing 1956. At least one oscillating propulsor 1920 is cooperatively connected to the output arm of the lever. Actuation of the pedal 1966 and the handle 1968, by foot and hand for example, rocks the oscillating propulsor 1920 in an arc, as shown by top arrows. Air is thrust downward from the oscillating propulsor 1920 to exert lift on the craft, as indicated by bottom arrows.

Size and number of the oscillating propulsor 1920, stroke rate and length would have to be sufficient to lift the total weight of the craft, including contents. A twin lever system, as illustrated in FIG. 19 would be advantageous for balance of a human operator. A harness for the operator, secured to a safety bracket A, would be required (not shown). Harnesses used in parachuting, skydiving and like activities can be attached to the craft to secure the operator to the craft.

Whilst the example depicted in FIG. 19 shows direct drive of a plurality of oscillating propulsors, it should be understood that indirect drive with stroke rate multiplication can be utilized as required to generate the effective thrust for any given construction of this embodiment. For example, a hand and foot bicycle type drive system can be coupled to a Scotch Yoke mechanism to oscillate the apparatus at the effective stroke length and frequency.

Since other modifications and changes varied to fit particular operating requirements and environments will be apparent to those skilled in the art, the invention is not considered limited to the example chosen for purposes of disclosure, and covers all changes and modifications which do not constitute departures from the scope of this invention.

Having thus described the invention, what is desired to be protected is presented in the subsequently appended claims.

7. LIST OF REFERENCE SIGNS

3 trailing edge
20 oscillating propulsor
30 curved body
32 actuating member
34 aperture
36 flat end cap
38 spherical end cap
40 drag reduction member
42 intake opening
44 fore fin
46 aft fin
48 lubricant inlet
50 lubricant outlet
52 pressure chamber
54 fulcrum
56 bearing
58 control arm
60 motion transmitter
62 guide
64 steering member
66 pedal
68 handle
70 spring
72 impulse plate
74 cylindrical head
76 resilient sheet

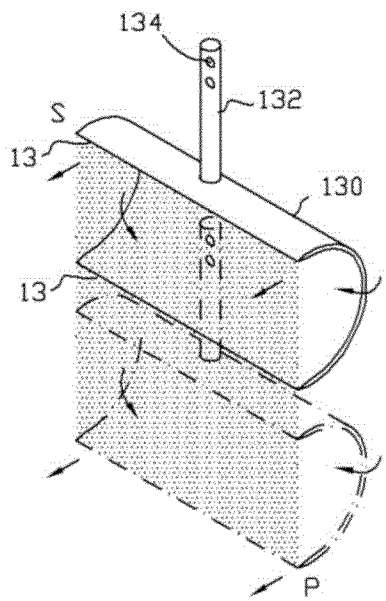
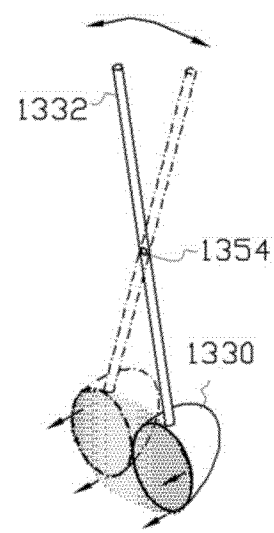

The invention claimed is:

1. A curved body, for propelling fluids, crafts and harnessing fluid power, having a section plane and comprising:
a convex outer leading surface, and
a concave inner trailing surface, rigidly integrated to the convex outer leading surface in a substantially concentric manner to define an open vessel with trailing edges of its opening coplanar with the section plane, whereby upon oscillation in the section plane, in any direction offset to the trailing edges, ambient fluids are accelerated and ejected from the open vessel, thereby propelling the curved body and the ambient fluids in opposite directions.

2. The curved body of claim 1, wherein the open vessel is a segment of a sphere.

3. The curved body of claim 1, wherein the open vessel is a segment of a cylinder.

4. The curved body of claim 1, wherein the open vessel is a segment of a cylinder with flat end caps.

5. The curved body of claim 1, wherein the open vessel is a segment of a cylinder with spherical end caps.

6. The curved body of claim 1, wherein the open vessel is a segment of a cylinder bent into a toroidal shape.

7. The apparatus of claim 1, wherein the concave inner trailing surface rigidly integrated to the convex outer leading surface in a substantially concentric manner includes a radiused trailing edges, whereby ambient fluids ejected from the concave inner trailing surface are redirected towards the convex outer leading surface, thereby causing reverse propulsion.

8. The apparatus as recited in claim 1, further comprising:
an actuating member, cooperatively secured to the curved body, whereby motive power is transmitted thereby enabling oscillation of the curved body.

9. The apparatus of claim 1 or 8, wherein at least one intake opening is provided through the convex outer leading surface and the concave inner trailing surface, whereby ambient fluids are admitted and drag is reduced.

10. The apparatus of claim 1 or 8, further including an impulse plate, securely attached to the concave inner trailing surface of the curved body, whereby energy in moving fluid is converted into a propulsive impulse before ejection from the concave inner trailing surface.

11. The apparatus of claim 1 or 8, further including at least one fin, comprising:
a cylindrical head, cooperatively connected to the curved body, and
a resilient sheet, cooperatively secured to the cylindrical head, whereby upon oscillation, ambient fluids and the curved body with the fin are propelled in opposite directions and fluid drag is reduced.

12. The apparatus of claim 1 or 8, further comprising lubricant cavity provision systems, fluidly connected to the curved body, whereby a lubricant cavity is coated over the convex outer leading surface of the open vessel, thereby reducing fluid drag.

13. The apparatus of claim 11 wherein the radius of the cylindrical head is blended into the resilient sheet using flexible material.

14. The apparatus of claim 1 wherein surface configuration and mechanical vibration friction-reducing devices are provided on the open vessel whereby the formation of a reduced viscosity boundary layer is promoted thereby reducing drag of the apparatus in the ambient fluids.

15. The apparatus as recited in claim 9, wherein provision of the intake opening reduces the open vessel to a paired assembly of curved plates, with trailing edges and leading edges.

16. The apparatus as recited in claim 15, wherein the distance between the curved plates at the leading edges is less than one time the corresponding distance between the curved plates at the trailing edges, whereby the frontal stagnant pressure zone is mitigated.

17. The apparatus of claim 15 or 16, wherein under partially submerged operation, the open vessel is reduced to the structure of a single curved plate.

18. The apparatus of claim 1 wherein upon oscillation in the section plane comprises electromagnetic actuation.

19. A method of propelling ambient fluids, crafts, and harnessing fluid power, comprising the steps of:
cooperatively securing to a base at least a first one of the apparatus of claim 1, and
oscillating the at least a first one of the apparatus of claim 1 whereby ambient fluids are accelerated and ejected from the open vessel, thereby propelling the base and the ambient fluids in opposite directions.

20. A craft for transportation in and about fluids comprising:
a base,
a motive power source, securely attached to the base, and
at least a first open vessel, cooperatively connected to the motive power source, wherein the open vessel comprises a section plane, and a convex outer leading surface rigidly integrated to a concave inner trailing surface in a substantially concentric manner to define an open vessel with trailing edges of its opening coplanar with the section plane, whereby upon oscillation in the section plane, in any direction offset to the trailing edges, ambient fluids are accelerated and ejected from the at least a first open vessel, thereby propelling the base and the ambient fluids in opposite directions.

21. The craft of claim 20, further comprising at least a second open vessel, securely attached to the base, whereby the reaction momentum of the motive power source on the base actuates the at least a second open vessel to propel the base.

22. The craft of claim 20 further comprising lubricant cavity provision systems, secured to the base and fluidly connected to the open vessel, whereby a lubricant cavity is coated over the open vessel thereby reducing drag in the ambient fluids.

23. The craft of claim 21 wherein ambient fluids ejected from the at least a first open vessel are directed to the intake of the at least a second open vessel thereby providing looped feedback propulsion enhancement.

24. The craft as recited in claim 20 wherein the base is an aircraft, whereby the ambient fluids accelerated and ejected from the open vessel propel the aircraft to fly.

25. The craft as recited in claim 20, wherein the base is a hybrid aircraft-in-water, whereby the ambient fluids accelerated and ejected from the open vessel propel the hybrid aircraft-in-water to lift off the water thereby reducing drag and therefore increasing propulsion efficiency in the water.

26. The craft as recited in claim 20 wherein the base is a hybrid water and air craft whereby air and water accelerated and ejected from the open vessel enable water based flight and full airborne flight.

27. The craft as recited in claim 20 wherein the base is supported in the ambient fluids by the open vessel.

28. The craft of claim 27 wherein the base is supported in the ambient fluids by the open vessel comprises buoyancy of the open vessel, whereby the base is buoyed.

29. The craft of claim 27 wherein the base is supported in the ambient fluids by the open vessel comprises fluid dynamic forces acting on the open vessel whereby lift is effected.

30. The craft as recited in claim 20 wherein at least a first open vessel cooperatively connected to the motive power source includes a connection rotatable to the base, whereby steering of the craft in the ambient fluids is effected.

31. The craft as recited in claim 20 or 21 wherein propelling the base includes twinned open vessels whereby differential thrusting enables steering of the craft in the ambient fluids.

32. The craft as recited in claim 20 wherein upon oscillation includes actuation by wave power from the ambient fluids, whereby the open vessel is reciprocated.

33. A curved body, for propelling fluids, crafts and harnessing fluid power, having a section plane and comprising: a convex outer leading surface, and a concave inner trailing surface, rigidly integrated to the convex outer leading surface in a substantially concentric manner to define an open vessel with trailing edges of its opening coplanar with the section plane, wherein at least one intake opening is provided through the convex outer leading surface and the concave inner trailing surface, whereby upon oscillation in the section plane, in any direction offset to the trailing edges, ambient fluids are accelerated and ejected from the open vessel, thereby propelling the curved body and the ambient fluids in opposite directions.

34. The curved body of claim 33, wherein the open vessel is a segment of a sphere.

35. The curved body of claim 33, wherein the open vessel is a segment of a cylinder.

36. The curved body of claim 33, wherein the open vessel is a segment of a cylinder with flat end caps.

37. The curved body of claim 33, wherein the open vessel is a segment of a cylinder with spherical end caps.

38. The curved body of claim 33, wherein the open vessel is a segment of a cylinder bent into a toroidal shape.

39. The apparatus of claim 33, wherein the concave inner trailing surface rigidly integrated to the convex outer leading surface in a substantially concentric manner includes radiused trailing edges, whereby ambient fluids ejected from the concave inner trailing surface are redirected towards the convex outer leading surface, thereby causing reverse propulsion.

40. The apparatus as recited in claim 33, further comprising: an actuating member, cooperatively secured to the curved body, whereby motive power is transmitted thereby enabling oscillation of the curved body.

41. The apparatus of claim 33 or 40, further including an impulse plate, securely attached to the concave inner trailing surface of the curved body, whereby energy in moving fluid is converted into a propulsive impulse before ejection from the concave inner trailing surface.

42. The apparatus of claim 33 or 40, further including at least one fin, comprising: a cylindrical head, cooperatively connected to the curved body, and a resilient sheet, cooperatively secured to the cylindrical head, whereby upon oscillation, ambient fluids and the curved body with the fin are propelled in opposite directions and fluid drag is reduced.

43. The apparatus of claim 33 or 40, further comprising lubricant cavity provision systems, fluidly connected to the curved body, whereby a lubricant cavity is coated over the convex outer leading surface of the open vessel, thereby reducing fluid drag.

44. The apparatus of claim 42 wherein the radius of the cylindrical head is blended into the resilient sheet using flexible material.

45. The apparatus of claim 33 wherein surface configuration and mechanical vibration friction-reducing devices are provided on the open vessel whereby the formation of a reduced viscosity boundary layer is promoted thereby reducing drag of the apparatus in the ambient fluids.

46. The apparatus as recited in claim 33, wherein provision of the intake opening reduces the open vessel to a paired assembly of curved plates, with trailing edges and leading edges.

47. The apparatus as recited in claim 46, wherein the distance between the curved plates at the leading edges is less than one time the corresponding distance between the curved plates at the trailing edges, whereby the frontal stagnant pressure zone is mitigated.

48. The apparatus of claim 46 or 47, wherein under partially submerged operation, the open vessel is reduced to the structure of a single curved plate.

49. The apparatus of claim 33 wherein upon oscillation in the section plane comprises electromagnetic actuation.

50. A craft for transportation in and about fluids comprising: a base, a motive power source, securely attached to the base, and at least a first open vessel, cooperatively connected to the motive power source, wherein the open vessel comprises a section plane, and a convex outer leading surface rigidly integrated to a concave inner trailing surface in a substantially concentric manner to define an open vessel with trailing edges of its opening coplanar with the section plane, wherein at least one intake opening is provided through the convex outer leading surface and the concave inner trailing surface, whereby upon oscillation in the section plane, in any direction offset to the trailing edges, ambient fluids are accelerated and ejected from the at least a first open vessel, thereby propelling the base and the ambient fluids in opposite directions.

51. The craft of claim 50 further comprising lubricant cavity provision systems, secured to the base and fluidly connected to the open vessel, whereby a lubricant cavity is coated over the open vessel thereby reducing drag in the ambient fluids.

52. The craft as recited in claim 50 wherein the base is an aircraft, whereby the ambient fluids accelerated and ejected from the open vessel propel the aircraft to fly.

53. The craft as recited in claim 50, wherein the base is a hybrid aircraft-in-water, whereby the ambient fluids accelerated and ejected from the open vessel propel the hybrid aircraft-in-water to lift off the water thereby reducing drag and therefore increasing propulsion efficiency in the water.

54. The craft as recited in claim 50 wherein the base is a hybrid water and air craft whereby air and water accelerated and ejected from the open vessel enable water based flight and full airborne flight.

55. The craft as recited in claim 50 wherein the base is supported in the ambient fluids by the open vessel.

56. The craft of claim 55 wherein the base is supported in the ambient fluids by the open vessel comprises buoyancy of the open vessel, whereby the base is buoyed.

57. The craft of claim 55 wherein the base is supported in the ambient fluids by the open vessel comprises fluid dynamic forces acting on the open vessel whereby lift is effected.

58. The craft as recited in claim 50 wherein at least a first open vessel cooperatively connected to the motive power source includes a connection rotatable to the base, whereby steering of the craft in the ambient fluids is effected.

59. The craft as recited in claim 50 wherein upon oscillation includes actuation by wave power from the ambient fluids, whereby the open vessel is reciprocated.

60. A method of propelling ambient fluids, crafts, and harnessing fluid power, comprising the steps of: cooperatively securing to a base at least a first one of the apparatus of claim 33, and oscillating the at least a first one of the apparatus of claim 33 whereby ambient fluids are accelerated and ejected from the open vessel, thereby propelling the base and the ambient fluids in opposite directions.

* * * * *

UNITED STATES PATENT AND TRADEMARK OFFICE
CERTIFICATE OF CORRECTION

PATENT NO. : 10,273,932 B2
APPLICATION NO. : 14/889614
DATED : April 30, 2019
INVENTOR(S) : Kassianoff Page 1 of 3

It is certified that error appears in the above-identified patent and that said Letters Patent is hereby corrected as shown below:

On the Title Page

Delete the title page and substitute therefore with the attached title page consisting of the corrected illustrative figure(s).

In the Drawings

Please replace FIGS. 1, 1A, and 2 with FIGS. 1, 1A, and 2 as shown on the attached page.

In the Specification

Column 2, Line 41: change 'die convex' to -the convex-.

Signed and Sealed this
Eleventh Day of August, 2020

Andrei Iancu
*Director of the United States Patent and Trademark Office*

United States Patent
Kassianoff

(10) Patent No.: US 10,273,932 B2
(45) Date of Patent: Apr. 30, 2019

(54) OSCILLATING PROPULSOR

(71) Applicant: Edouard Kassianoff, Calgary (CA)

(72) Inventor: Edouard Kassianoff, Calgary (CA)

(*) Notice: Subject to any disclaimer, the term of this patent is extended or adjusted under 35 U.S.C. 154(b) by 0 days.

(21) Appl. No.: 14/889,614

(22) PCT Filed: Jun. 25, 2014

(86) PCT No.: PCT/CA2014/050605
§ 371 (c)(1),
(2) Date: Nov. 12, 2015

(87) PCT Pub. No.: WO2015/003261
PCT Pub. Date: Jan. 15, 2015

(65) Prior Publication Data
US 2016/0083060 A1

(30) Foreign App
Jul. 11, 2013 (CA) .................. 2821427
Nov. 7, 2013 (CA) .................. 2832623
Jun. 12, 2014 (CA) .................. 2854305

(51) Int. Cl.
B63H 1/30 (2006.01)
B60F 3/00 (2006.01)
(Continued)

(52) U.S. Cl.
CPC ............ *F03B 17/06* (2013.01); *B60F 3/0007* (2013.01); *B63H 1/30* (2013.01); *B63H 1/32* (2013.01);
(Continued)

(58) Field of Classification Search
CPC .... B63H 1/32; B63H 1/30; F03B 13/20; F03B 17/06; F03D 5/06; Y02E 10/38;
(Continued)

(56) References Cited
U.S. PATENT DOCUMENTS
2,751,876 A * 6/1956 Ogilvie .................. B63H 1/32
440/25
3,757,729 A * 9/1973 Golden .................. B63H 16/04
440/19
(Continued)

FOREIGN PATENT DOCUMENTS
GB 962917 * 7/1964

*Primary Examiner* — Michael C Zarroli

(57) ABSTRACT

A curved body (830), for propelling fluids, crafts and harvesting fluid power, comprises a convex outer leading surface securely connected to a concave inner trailing surface to define an open vessel. Upon oscillation, ambient fluids are accelerated and ejected from the vessel to propel the vessel and the ambient fluids in opposite directions. Apparatus is secured to a motive power source directly or via actuating member (832), by fastening through aperture (834). The oscillating propulsor can be operated directly by a reciprocating motive power source, and indirectly by the reaction momentum imparted to a supporting base. Thrust may be vectored by rotation of the curved body (830) about the supporting base. Drag reduction using fluid dynamic shapes, intake openings, a fore fin (844), an aft fin (846), and a lubricant cavity, are embodied. Enhanced propulsion using multistage oscillating propulsors is embodied.

60 Claims, 12 Drawing Sheets